(12) United States Patent
Todo et al.

(10) Patent No.: US 7,536,080 B2
(45) Date of Patent: May 19, 2009

(54) SIGNAL PROCESSING APPARATUS

(75) Inventors: Shin Todo, Tokyo (JP); Yoshinori Suzuki, Kanagawa (JP); Haruo Togashi, Kanagawa (JP); Akira Sugiyama, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1090 days.

(21) Appl. No.: 10/209,426

(22) Filed: Jul. 31, 2002

(65) Prior Publication Data

US 2003/0026590 A1  Feb. 6, 2003

(30) Foreign Application Priority Data

Aug. 2, 2001  (JP)  ............................ P2001-235263

(51) Int. Cl.
*H04N 5/91* (2006.01)
*H04N 7/64* (2006.01)

(52) U.S. Cl. ............................ 386/83; 386/95; 386/113

(58) Field of Classification Search ................. 348/173, 348/177, 180, 732; 386/46, 67, 83, 95, 113; 369/59.24–59.26; 370/503
See application file for complete search history.

(56) References Cited

U.S. PATENT DOCUMENTS

| | | | | |
|---|---|---|---|---|
| 4,868,653 A | * | 9/1989 | Golin et al. | ............ 375/240.23 |
| 5,023,710 A | * | 6/1991 | Kondo et al. | ............ 375/240.24 |
| 5,442,400 A | | 8/1995 | Sun et al. | |
| 5,455,629 A | * | 10/1995 | Sun et al. | ................ 375/240.27 |
| 5,686,965 A | | 11/1997 | Auld | |
| 5,852,469 A | | 12/1998 | Nagai et al. | |
| 6,470,142 B1 | * | 10/2002 | Isozaki et al. | ................. 386/124 |
| 6,690,879 B2 | * | 2/2004 | Uchida et al. | .................. 386/67 |
| 6,741,292 B1 | * | 5/2004 | Shen et al. | ................... 348/553 |
| 2001/0041043 A1 | * | 11/2001 | Abe et al. | ...................... 386/39 |

FOREIGN PATENT DOCUMENTS

GB  2 341 509  3/2000

* cited by examiner

*Primary Examiner*—Thai Tran
*Assistant Examiner*—Hung Q Dang
(74) *Attorney, Agent, or Firm*—Frommer Lawrence & Haug LLP; William S. Frommer; Thomas F. Presson

(57) ABSTRACT

A signal processing apparatus that enables while a significant video signal is not being output, a stream that is decoded to a black picture signal is output along with a base band signal that causes a block picture to be displayed. The signal is reproduced, as an MPEG stream. The MPEG stream is input to a first input terminal of a switch. The MPEG stream is supplied to a black stream generating circuit. A non-signal detector detects a non-signal state of the stream. In a non-signal period, a second input terminal of the switch is selected. A stream generator generates a black stream that causes a black screen to be displayed, which is input to the second input terminal of the switch, and is obtained from a stream output terminal through a switch.

20 Claims, 38 Drawing Sheets

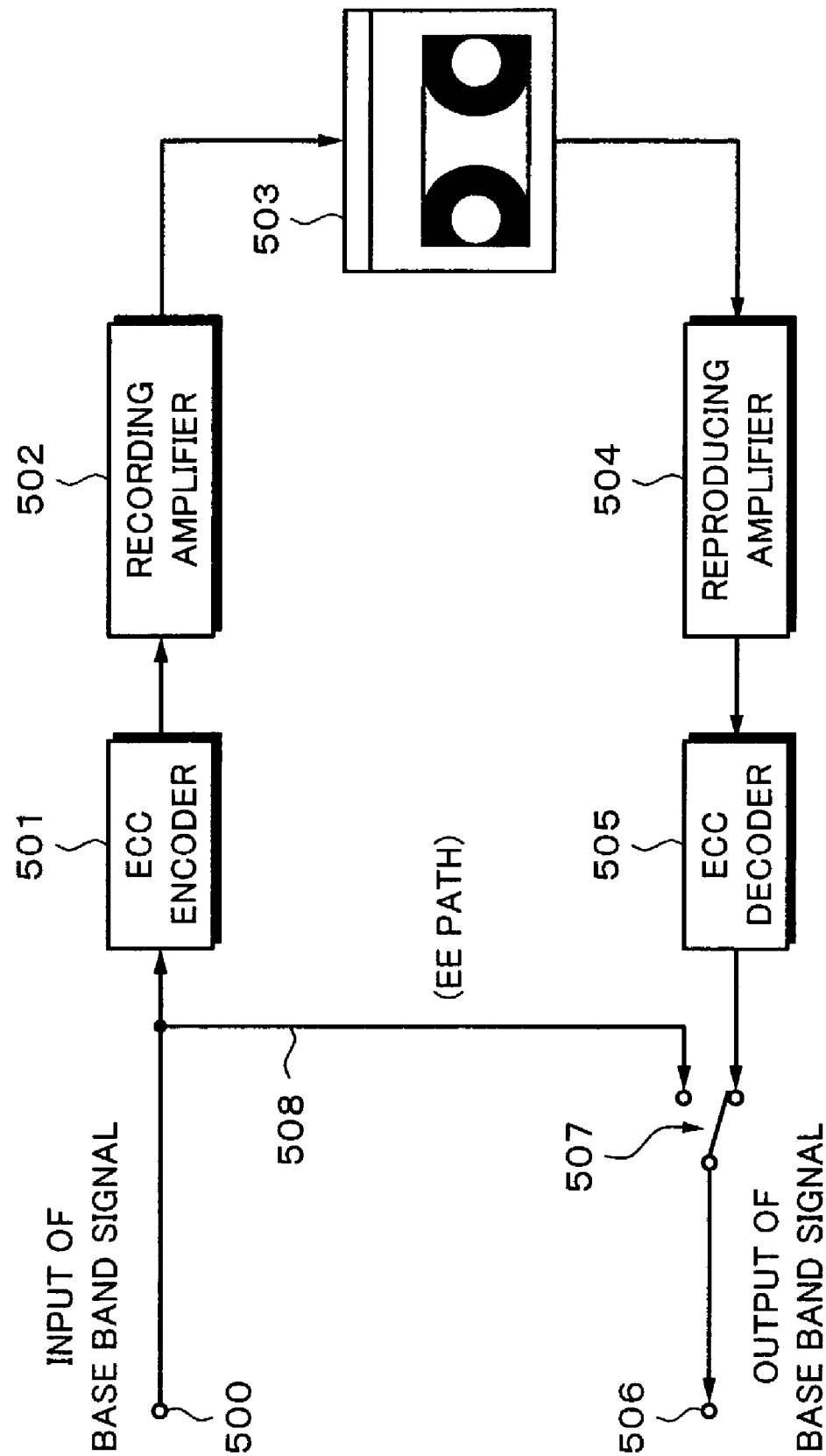

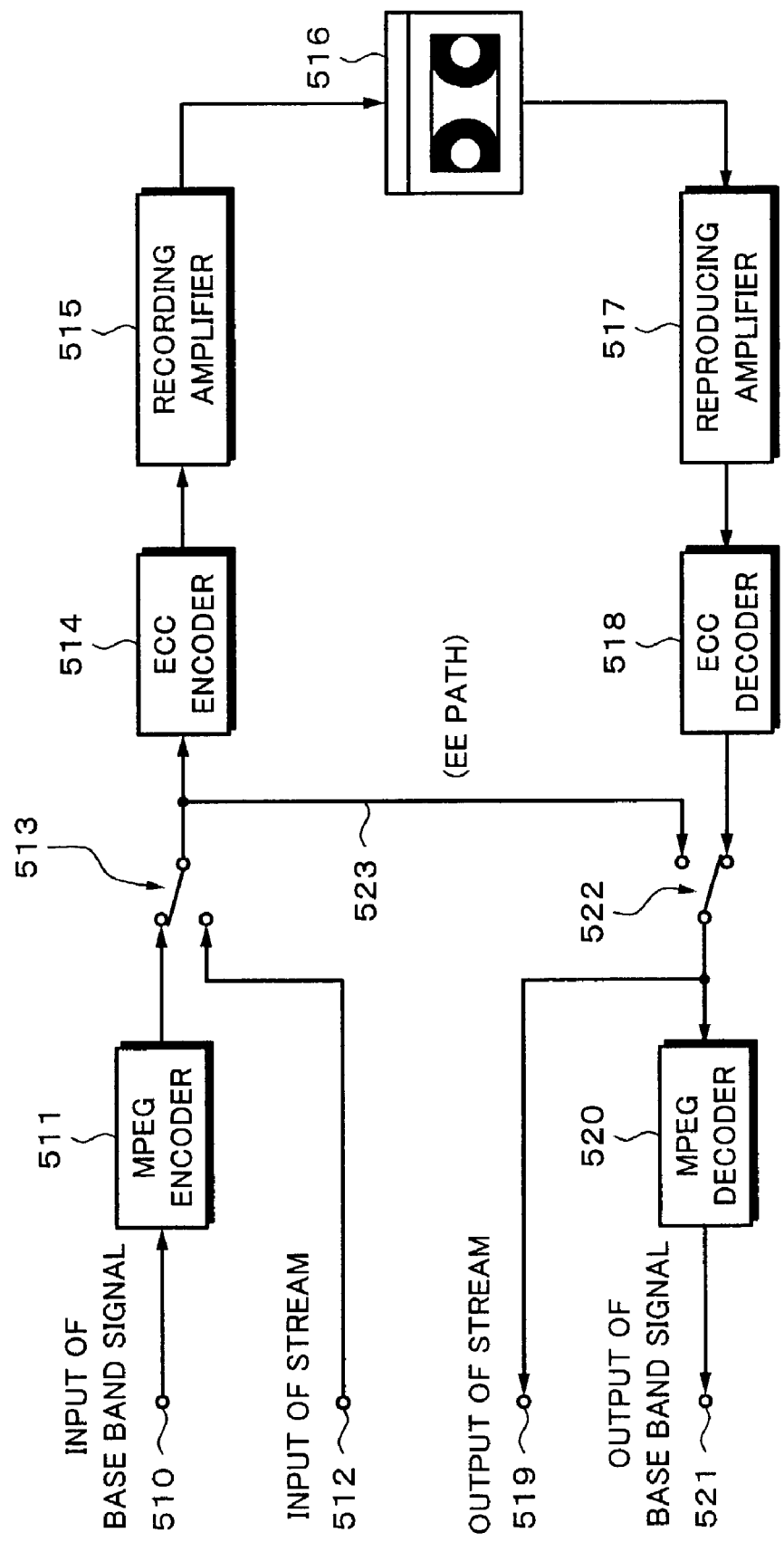

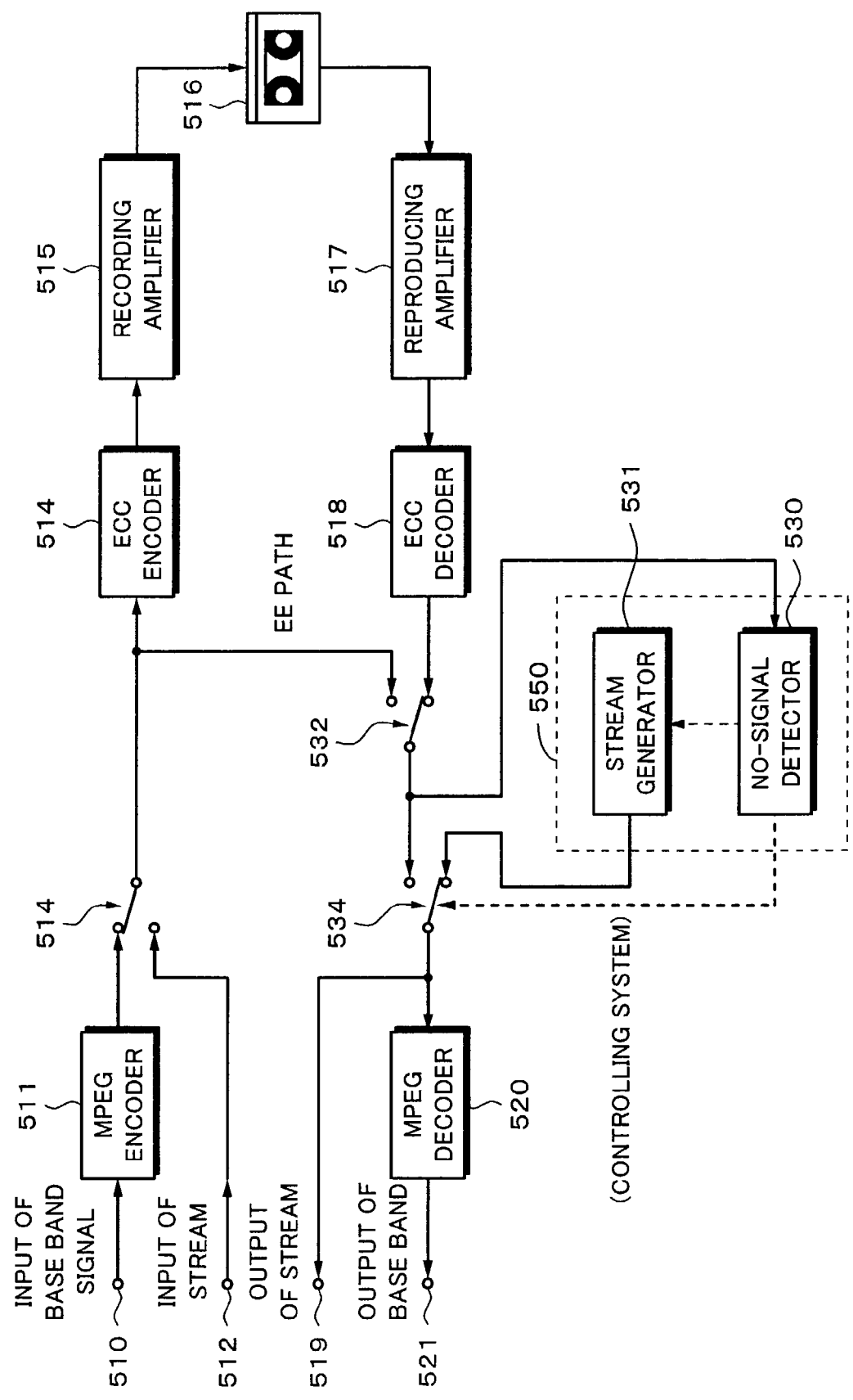

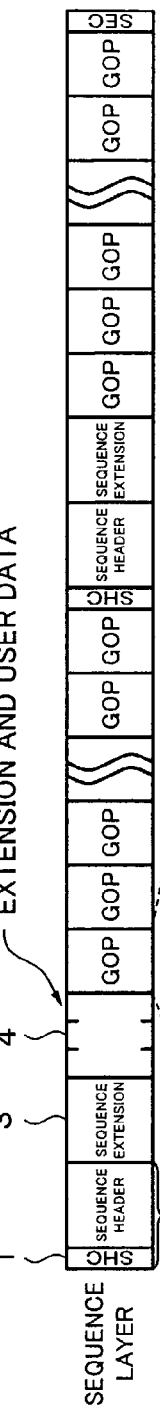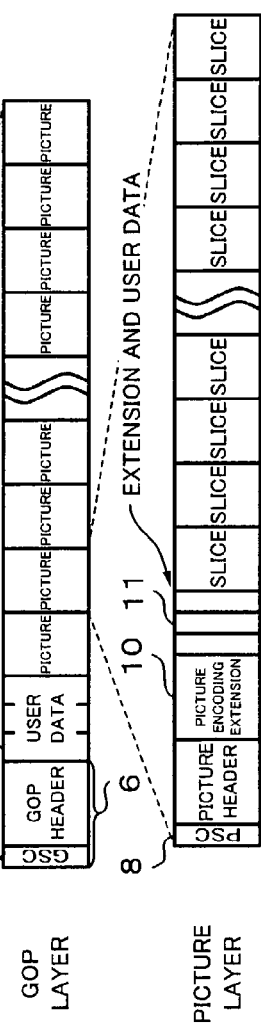
Fig. 4A  Sequence Layer
Fig. 4B  GOP Layer
Fig. 4C  Picture Layer
Fig. 4D  Slice Layer
Fig. 4E  Macro Block Layer

Fig. 5

| CODE NAME | NUMBER OF BITS | CONTENT |
|---|---|---|
| sequence header code | 32 | SEQUENCE HEADER CODE |
| horizontal size value | 12 | LOW ORDER 12 BITS OF NUMBER OF PIXELS IN HORIZONTAL DIRECTION |
| vertical size value | 12 | LOW ORDER 12 BITS OF NUMBER OF LINES IN VERTICAL DIRECTION |
| aspect ratio information | 4 | PIXEL ASPECT RATIO INFORMATION |
| frame rate code | 4 | FRAME RATE CODE |
| bit rate value | 18 | LOW ORDER 18 BITS OF BIT RATE (INDICATED IN THE UNIT OF 400 BITS) |
| vbv buffer size value | 10 | LOW ORDER 10 BITS OF VBV BUFFER SIZE |
| intra quantiser matrix [64] | 8*64 | QUANTIZER MATRIX VALUE FOR INTRA MB |
| non intra quantiser matrix [64] | 8*64 | QUANTIZER MATRIX VALUE FOR NON-INTRA MB |

Fig. 6

| CODE NAME | NUMBER OF BITS | CONTENT |
|---|---|---|
| profile and level indication | 8 | PROFILE, LEVEL |
| progressive sequence | 1 | PROGRESSIVE PICTURE FLAG OF ENTIRE SEQUENCE |
| chroma format | 2 | CHROMA FORMAT |
| low delay | 1 | LOW DELAY MODE (WITHOUT B PICTURE) |

Fig. 7

| CODE NAME | NUMBER OF BITS | CONTENT |
|---|---|---|
| extension data (0) | | EXTENSION DATA (0) |
| sequence display extension ( ) | | SEQUENCE DISPLAY ( ) |
| sequence scalable extension ( ) | | SEQUENCE SCALABLE EXTENSION ( ) |
| extension start code identifier | 4 | SEQUENCE SCALABLE EXTENSION ID |
| scalable mode | 2 | SCALABILITY MODE |
| layer id | 4 | LAYER ID OF SCALABLE HIERARCHY |
| IN THE CASE OF SPATIAL SCALABILITY | | |
| lower layer prediction horizontal size | 14 | HORIZONTAL SIZE OF PREDICTIVE LOWER LAYER |
| lower layer prediction vertical size | 14 | VERTICAL SIZE OF PREDICTIVE LOWER LAYER |
| vertical subsampling factor n | 5 | UP-SAMPLE DIVISOR IN VERTICAL DIRECTION |
| IN THE CASE OF TEMPORAL SCALABILITY | | |
| picture mux order | 3 | NUMBER OF PICTURES OF ADDITIONAL LAYER BEFORE FIRST BASE LAYER PICTURE |
| picture mux factor | 3 | NUMBER OF PICTURES OF ADDITIONAL LAYER BETWEEN BASE LAYERS |
| user data ( ) | | USER DATA ( ) |
| user data | 8 | USER DATA |

Fig. 8

| CODE NAME | NUMBER OF BITS | CONTENT |
|---|---|---|
| group start code ( ) | 32 | GOP START CODE |
| time code | 25 | TIME CODE (HOUR, MINUTE, SECOND, PICTURE) |
| closed gop | 1 | FLAG REPRESENTING INDEPENDENCY OF GOP |
| broken link | 1 | VALIDITY FLAG OF B PICTURE FOLLOWED BY I PICTURE OF GOP |

Fig. 9

| CODE NAME | NUMBER OF BITS | CONTENT |
|---|---|---|
| extension data (1) | | EXTENSION DATA (1) |
| user data ( ) | | USER DATA ( ) |
| user data | 8 | USER DATA |

Fig. 10

| CODE NAME | NUMBER OF BITS | CONTENT |
|---|---|---|
| picture start code | 32 | PICTURE START CODE |
| temporal reference | 10 | DISPLAY SEQUENCE OF PICTURES OF GOP (MODULO 1024) |
| picture coding type | 3 | PICTURE CODING TYPE (I, B, P) |
| vbv delay | 16 | VBV DELAY AMOUNT UNTIL DECODING IS STARTED |

Fig. 11

| CODE NAME | NUMBER OF BITS | CONTENT |
|---|---|---|
| f code [s][t] | 4*4 | RANGE OF MOVING VECTOR IN FORWARD AND BACKWARD DIRECTIONS (S) AND HORIZONTAL AND VERTICAL DIRECTIONS (T) |
| intra dc precision | 2 | ACCURACY OF DC COEFFICIENT OF INTRA MB |
| picture structure | 2 | PICTURE STRUCTURE (FRAME, FIELD) |
| top field first | 1 | DESIGNATION OF DISPLAY FIELD |
| frame pred frame dct | 1 | FRAME PREDICTION + FRAME DCT FLAG |
| concealment motion vectors | 1 | INTRA MB CONCEALMENT MV FLAG |
| q scale type | 1 | QUANTIZER SCALE TYPE (LINEAR, NON-LINEAR) |
| intra vlc format | 1 | VLC TYPE OF INTRA MB |
| alternate scan | 1 | SCANNING TYPE (ZIGZAG, ALTERNATE) |
| repeat first field | 1 | 2 : 3 PULL-DOWN FIELD REPEAT |
| chroma 420 type | 1 | SAME VALUE AS THAT OF PROGRESSIVE FRAME IN 4 : 2 : 0 |
| progressive frame | 1 | PROGRESSIVE FRAME FLAG |

Fig. 12

| CODE NAME | NUMBER OF BITS | CONTENT |
|---|---|---|
| extension data (2) | | EXTENSION DATA (2) |
| quant matrix extension ( ) | | QUANTIZER MATRIX EXTENSION ( ) |
| intra quantiser matrix [64] | 8 * 64 | INTRA MB QUANTIZER MATRIX |
| non intra quantiser matrix [64] | 8 * 64 | NON-INTRA MB QUANTIZER MATRIX |
| chroma intra quantiser matrix [64] | 8 * 64 | CHROMA INTRA QUANTIZER MATRIX |
| chroma non intra quantiser matrix [64] | 8 * 64 | CHROMA NON-INTRA QUANTIZER MATRIX |
| copyright extension ( ) | | COPYRIGHT EXTENSION ( ) |
| picture display extension ( ) | | PICTURE DISPLAY EXTENSION ( ) |
| picture spatial scalable extension ( ) | | PICTURE SPATIAL SCALABLE EXTENSION ( ) |
| spatial temporal weight code table index | 2 | UP-SAMPLE SPATIAL AND TEMPORAL WEIGHTING TABLE |
| lower layer progressive frame | 1 | LOWER LAYER PROGRESSIVE PICTURE FLAG |
| lower layer deinterlaced field select | 1 | FIELD SELECTION OF LOWER LAYER |
| picture temporal scalable extension ( ) | | PICTURE TEMPORAL SCALABLE EXTENSION ( ) |
| reference select code | 2 | SELECTION OF REFERENCE SCREEN |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

Fig. 13

| CODE NAME | NUMBER OF BITS | CONTENT |
|---|---|---|
| slice start code | 32 | SLICE START CODE + SLICE VERTICAL POSITION |
| slice vertical position extension | 3 | SLICE VERTICAL POSITION EXTENSION ( > 2800 LINES ) |
| priority breakpoint | 7 | DATA PARTITIONING BREAKPOINT |
| quantiser scale code | 5 | QUANTIZER SCALE CODE (1 TO 31) |
| intra slice | 1 | INTRA SLICE FLAG |
| macroblock ( ) | | MACRO BLOCK DATA ( ) |

Fig. 14

| CODE NAME | NUMBER OF BITS | CONTENT |
|---|---|---|
| macroblock escape | 11 | MB ADDRESS EXTENSION (>33) |
| macroblock address increment | 1-11 | DIFFERENCE BETWEEN ADDRESS OF CURRENT MB AND ADDRESS OF PRECEDING MB |
| macroblock modes ( ) | | MACRO BLOCK MODE ( ) |
| macroblock type | 1-9 | MB ENCODE TYPE (MC, CODED, ETC) |
| spatial temporal weight code | 2 | UP-SAMPLE TEMPORAL AND SPATIAL WEIGHTING CODE |
| frame motion type | 2 | MOTION COMPENSATION TYPE OF FRAME STRUCTURE |
| field motion type | 2 | MOTION COMPENSATION TYPE OF FIELD STRUCTURE |
| dct type | 1 | DCT TYPE (FRAME, FIELD) |
| quantiser scale code | 5 | MB QUANTIZER SCALE CODE (1 TO 31) |
| motion vectors (s) | | MOVING VECTOR (s) |
| motion vertical field select [r][s] | 1 | SELECTION OF REFERENCE FIELD USED FOR PREDICTION |
| motion vector (r, s) | | MOVING VECTOR (r, s) |
| motion code [r][s][t] | 1-11 | BASIC DIFFERENTIAL MOVING VECTOR |
| motion residual [r][s][t] | 1-8 | RESIDUAL VECTOR |
| dmvector [t] | 1-2 | DUAL PRIME DIFFERENTIAL VECTOR |
| coded block pattern ( ) | | CBP |
| block (i) | | BLOCK DATA ( ) |

Fig. 15

| CODE NAME | NUMBER OF BITS | CONTENT |
|---|---|---|
| dct dc size luminance | 2-9 | DCT LUMINANCE DC COEFFICIENT DIFFERENCE SIZE |
| dct dc differential | 1-11 | DCT LUMINANCE DC COEFFICIENT DIFFERENCE VALUE |
| dct dc size chrominance | 2-10 | DCT CHROMINANCE DC COEFFICIENT DIFFERENCE SIZE |
| dct dc differential | 1-11 | DCT CHROMINANCE DC COEFFICIENT DIFFERENCE VALUE |
| First DCT coefficient | 3-24 | FIRST NON-ZERO COEFFICIENT OF NON-INTRA BLOCK |
| Subsequent DCT coefficient | 2-24 | SUBSEQUENT DCT COEFFICIENT |
| End of block | 2 or 4 | DCT COEFFICIENT END FLAG IN BLOCK |

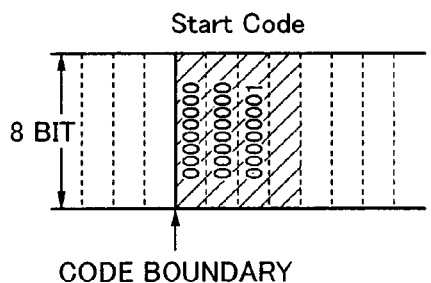

Fig. 16A

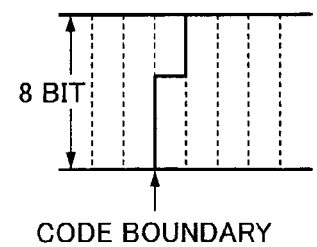

Fig. 16B

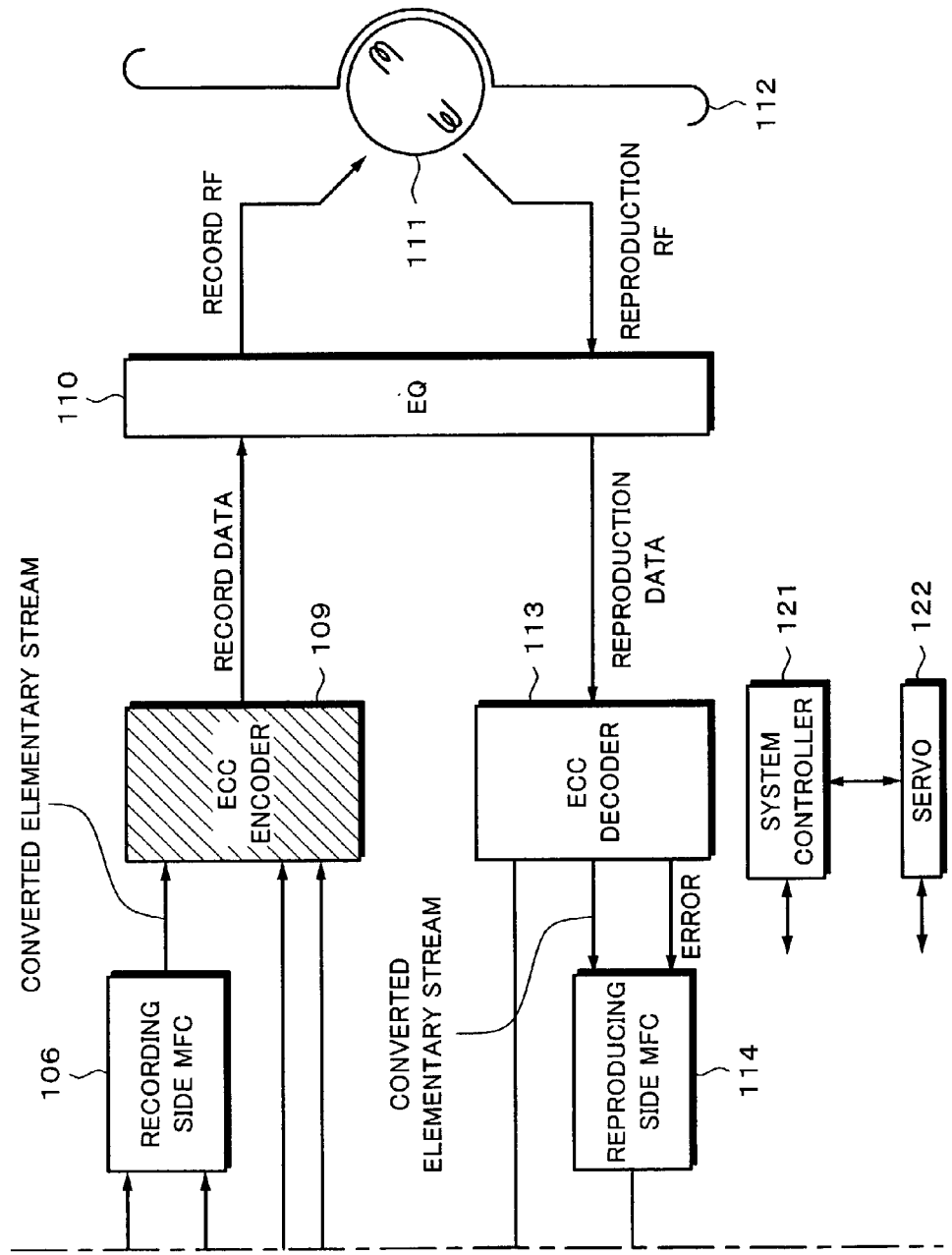

Fig. 26 picture_coding_type = "001"(I-Picture)

intra_dc_precision = "00"(8bit)

picture_structure = "11"(frame structure)

frame_pred_frame_dct = "1"

intra_vlc_format = "0"

Fig. 27A

```
int    mb_row, mb_column ;

for( mb_row = 0 ; mb_row < (vertical_size/16) ; mb_row++ )
{
    SLICE_HEADER for( mb_column = 0 ; mb_column < (horizontal_size/16) ; mb_column++ )
    {
        if( mb_column = 0 )
            MACROBLOCK_1
        else
            MACROBLOCK_2
    }
}
```

Fig. 27B

SLICE_HEADER = "00000000000000000000001"[mb_row+1] "000010"
MACROBROCK_1 = "1111111000011110100101001010010001000100010"
MACROBLOCK_2 = "1110010100101001010010001000100010"

[mb_row+1] : mb_row+1 IS REPRESENTED WITH EIGHT BITS IN BINARY NOTATION (MSB FIRST)

Fig. 28A

SLICE_HEADER

| | |
|---|---|
| "00000000 00000000 00000001 ********" | |
| | slice_start_code |
| "00001" | quantizer_scale_code |
| "0" | extra_bit_slice | quantizer_scale_code MAY BE ANY FIVE BIT VALUE
OTHER THAN "00000" IN THE EXAMPLE, IT IS ASSUMED
THAT VALUE OF quantizer_scale_code IS DESIGNATED "00001".

Fig. 28B

MACROBLOCK_1 (MACRO BLOCK AT LEFT END OF SCREEN)

| | |
|---|---|
| "1" | macroblock_address_increment = +1 |
| "1" | macroblock_type = Intra |
| "111110 0001111" "10" | Y = 16 (dct_diff = −112), EOB |
| "100" "10" | (dct_diff = 0 ), EOB |
| "100" "10" | (dct_diff = 0 ), EOB |
| "100" "10" | (dct_diff = 0 ), EOB |
| "00" "10" | Cb = 128 (dct_diff = 0 ), EOB |
| "00" "10" | Cr = 128 (dct_diff = 0 ), EOB |

Fig. 28C

MACROBLOCK_2 (MACRO BLOCK NOT AT LEFT END OF SCREEN)

| | |
|---|---|
| "1" | macroblock_address_increment = +1 |
| "1" | macroblock_type = Intra |
| "100" "10" | dct_diff = 0, EOB |
| "100" "10" | dct_diff = 0, EOB |
| "100" "10" | dct_diff = 0, EOB |
| "100" "10" | dct_diff = 0, EOB |
| "00" "10" | dct_diff = 0, EOB |
| "00" "10" | dct_diff = 0, EOB |

Fig. 29 picture_coding_type = "001"(I-Picture)
intra_dc_precision = "00"(8bit)
picture_structure = "11"(frame structure)
frame_pred_frame_dct = "1"
intra_vlc_format = "0"

Fig. 30A

```
int     mb_row, mb_column ;
for( mb_row = 0 ; mb_row < (vertical_size/16) ; mb_row++ )
{
    SLICE_HEADER
    for( mb_column = 0 ; mb_column < (horizontal_size/16) ; mb_column++ )
    {
        if( mb_column = 0 )
            MACROBLOCK_1
        else
            MACROBLOCK_2
    }
}
```

Fig. 30B

SLICE_HEADER = "00000000000000000000001"[mb_row+1] "000010"
MACROBROCK_1 = "1111111000011111010010100101001000100010001000100010"
MACROBLOCK_2 = "111001010010100101001000100010001000100010"

[mb_row+1] : mb_row+1 IS REPRESENTED WITH EIGHT BITS IN
BINARY NOTATION (MSB FIRST)

Fig. 31A

| SLICE_HEADER | |
|---|---|
| "00000000 00000000 00000001 ********" | |
| | slice_start_code |
| "00001" | quantizer_scale_code |
| "0" | extra_bit_slice | quantizer_scale_code MAY BE ANY FIVE BIT VALUE OTHER THAN "00000". IN THIS EXAMPLE, IT IS ASSUMED THAT THE VALUE OF QUANTIZER_SCALE_CODE IS DESIGNATED "00001".

Fig. 31B

| MACROBLICK_1 (MACRO BLOCK AT LEFT END OF SCREEN) | |
|---|---|
| "1" | macroblock_address_increment = +1 |
| "1" | macroblock_type = Intra |
| "111110 0001111" "10" | Y = 16 (dct_diff = −112), EOB |
| "100" "10" | (dct_diff = 0), EOB |
| "100" "10" | (dct_diff = 0), EOB |
| "100" "10" | (dct_diff = 0), EOB |
| "00" "10" | Cb = 128 (dct_diff = 0), EOB |
| "00" "10" | (dct_diff = 0), EOB |
| "00" "10" | Cr = 128 (dct_diff = 0), EOB |
| "00" "10" | (dct_diff = 0), EOB |

Fig. 31C

| MACROBLOCK_2 (MACRO BLOCK NOT AT LEFT END OF SCREEN) | |
|---|---|
| "1" | macroblock_address_increment = +1 |
| "1" | macroblock_type = Intra |
| "100" "10" | dct_diff = 0, EOB |
| "100" "10" | dct_diff = 0, EOB |
| "100" "10" | dct_diff = 0, EOB |
| "100" "10" | dct_diff = 0, EOB |
| "00" "10" | dct_diff = 0, EOB |
| "00" "10" | dct_diff = 0, EOB |
| "00" "10" | dct_diff = 0, EOB |
| "00" "10" | dct_diff = 0, EOB |

Fig. 32 picture_coding_type = "001"(I-Picture)
intra_dc_precision = "00"(8bit)
picture_structure = "11"(frame structure)
frame_pred_frame_dct = "1"
intra_vlc_format = "0"

Fig. 33A

```
int      mb_row, mb_column ;
for( mb_row = 0 ; mb_row < (vertical_size/16) ; mb_row++ )
{
   SLICE_HEADER
   for( mb_column = 0 ; mb_column < (horizontal_size/16) ; mb_column++ )
   {
      MACROBLOCK
   }
}
```

Fig. 33B

SLICE_HEADER = "00000000000000000000001" [mb_row+1] "000010"
MACROBLOCK = "11100101001010010100010001000010"

[bm_row+1] : mb_row+1 IS REPRESENTED WITH EIGHT BITS IN BINARY NOTATION (MSB FIRST)

Fig. 34A

SLICE_HEADER

"00000000 00000000 00000001 *******"
                              slice_start_code
"00001"                         quantizer_scale_code
"0"                                extra_bit_slice quatnizer_scale_code MAY BE ANY FIVE BIT VALUE
OTHER THAN "00000". IN THIS EXAMPLE,
IT IS ASSUMED THAT quantizer_scale_code IS "00001".

Fig. 34B

MACROBLOCK

| | |
|---|---|
| "1" | macroblock_address_increment = +1 |
| "1" | macroblock_type = Intra |
| "100" "10" | Y = 128/dct_diff = 0, EOB |
| "100" "10" | /dct_diff = 0, EOB |
| "100" "10" | /dct_diff = 0, EOB |
| "100" "10" | /dct_diff = 0, EOB |
| "00" "10" | Cb = 128/dct_diff = 0, EOB |
| "00" "10" | Cr = 128/dct_diff = 0, EOB |

Fig. 35 picture_coding_type = "001"(I-Picture)
intra_dc_precision = "00"(8bit)
picture_structure = "11"(frame structure)
frame_pred_frame_dct = "1"
intra_vlc_format = "0"

Fig. 36A

```
int     mb_row, mb_column ;
for( mb_row = 0 ; mb_row < (vertical_size/16) ; mb_row++ )
    {
    SLICE_HEADER
    for( mb_column = 0 ; mb_column < (horizontal_size/16) ; mb_column++ )
    {
        MACROBLOCK
    }
}
```

Fig. 36B

SLICE_HEADER = "00000000000000000000001" [mb_row+1] "000010"
MACROBLOCK_2 = "111001010010100101001000100010"

[mb_row+1] : mb_row+1 IS REPRESENTED WITH EIGHT BITS IN
BINARY NOTATION (MSB FIRST)

Fig. 37A

SLICE_HEADER

"00000000 00000000 00000001 ********"
              slice_start_code
"00001"             quantizer_scale_code
"0"               extra_bit_slice quantizer_scale_code IS ANY FIVE BIT VALUE OTHER THAN "00000"
IT IS ASSUMED THAT quantizer_scale_code IS "00001"

Fig. 37B

MACROBLOCK

| | |
|---|---|
| "1" | macroblock_address_increment = +1 |
| "1" | macroblock_type = Intra |
| "100" "10" | Y = 128/dct_diff = 0, EOB |
| "100" "10" | /dct_diff = 0, EOB |
| "100" "10" | /dct_diff = 0, EOB |
| "100" "10" | /dct_diff = 0, EOB |
| "00" "10" | Cb = 128/dct_diff = 0, EOB |
| "00" "10" | /dct_diff = 0, EOB |
| "00" "10" | Cr = 128/dct_diff = 0, EOB |
| "00" "10" | /dct_diff = 0, EOB |

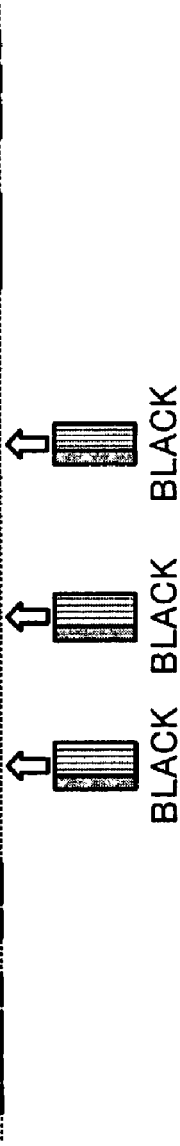
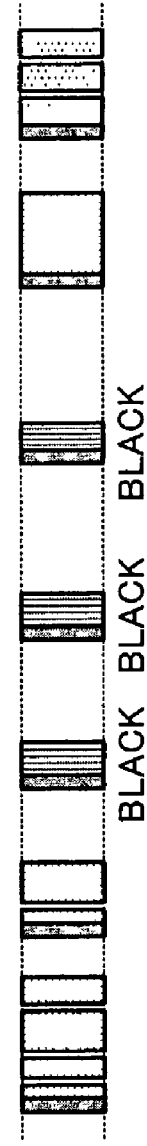
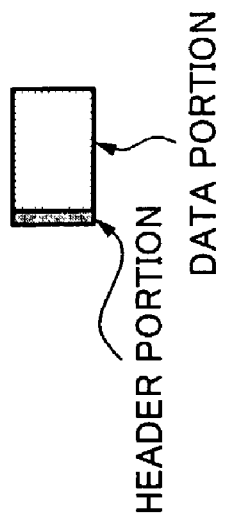
Fig. 38A  Fig. 38B  Fig. 38C  Fig. 38D

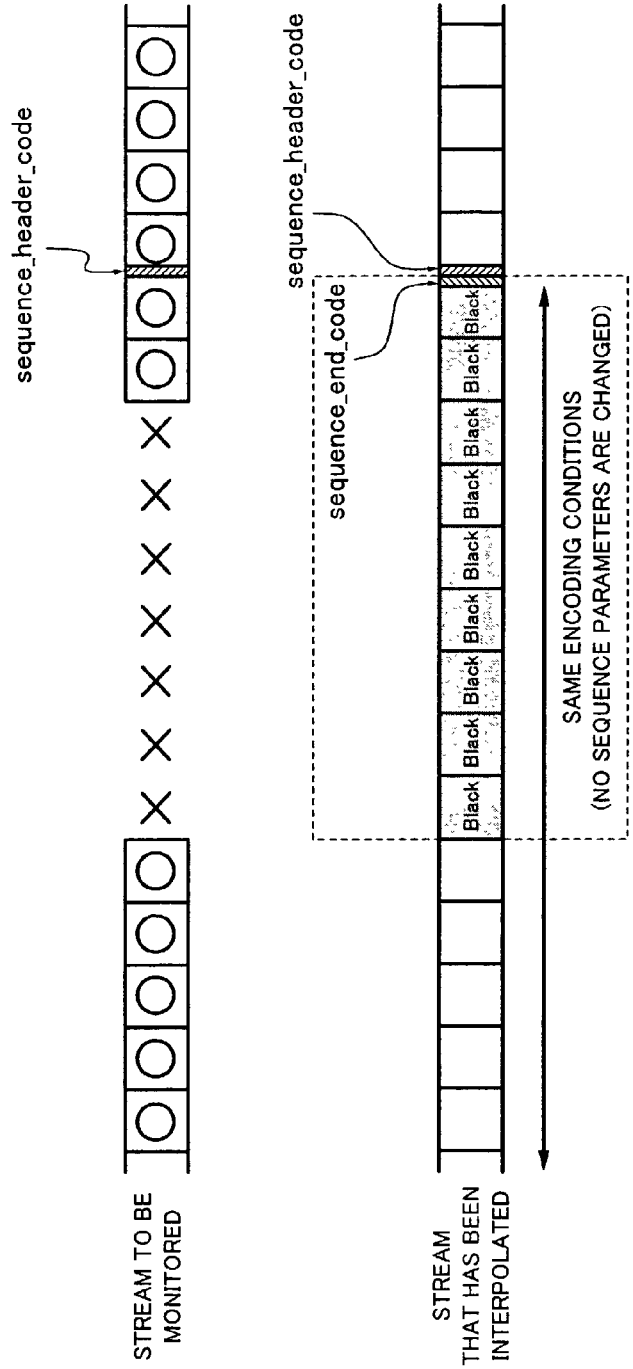

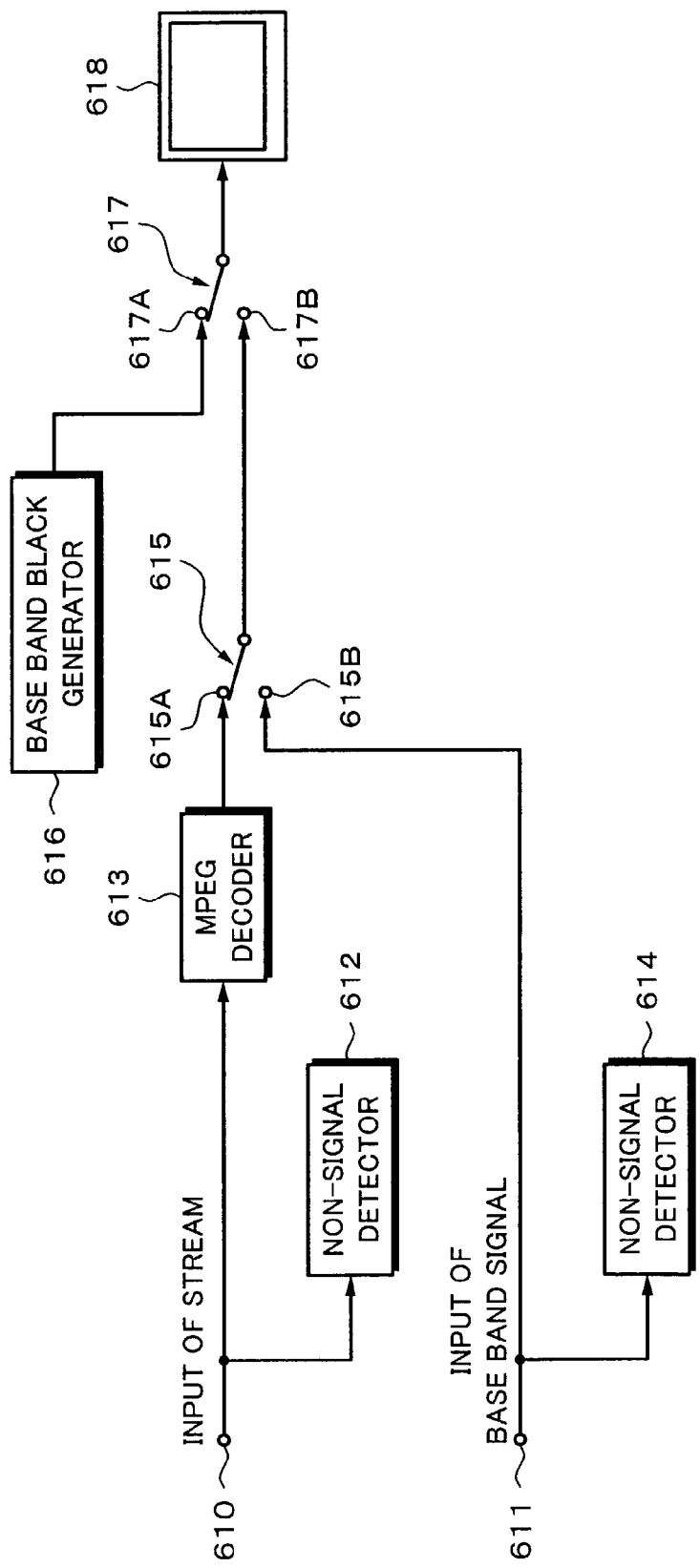

SIGNAL PROCESSING APPARATUS

BACKGROUND OF THE INVENTION

1. Field of the Invention

The present invention relates to a signal processing apparatus.

2. Description of the Related Art

As represented by a digital VCR (Video Cassette Recorder), a data recording and reproducing apparatus that records a digital video signal and a digital audio signal to a record medium and that reproduces them therefrom is known. Since the data capacity of a digital video signal is huge, it is normally compressed and encoded before it is recorded on the record medium. In recent years, the MPEG2 (Moving Picture Experts Group 2) system is known as a standard compressing and encoding system.

In picture compression technologies including the foregoing MPEG2 system, the data compression rate is improved using a variable length code. Thus, depending on the complexity of a picture to be compressed, the code amount of one screen (for example, one frame or one field) that has been compressed varies.

The forgoing MPEG2 system has a hierarchical structure composed of a macro block layer, a slice layer, a picture layer, a GOP layer, and a sequence layer disposed in the order from the bottom to the top. In the hierarchical structure, the slice layer is a unit of a variable length code encoding process. The macro block layer is composed of a plurality of DCT (Discrete Cosine Transform) blocks. At the beginning of each layer, a header portion that stores header information is disposed. For example, in the slice layer, by detecting the header portion, the delimitation position of a variable length code is detected. A decoder decodes a variable length code corresponding to the detected delimitation positions thereof.

When an apparatus does not output a significant signal (for example, when a video camera is in standby state, when a video monitor apparatus is in no signal input state, when a video recorder is in stop state or standby state, or when a switcher device is in no signal input state), it is not suitable to output a video signal of a noise contaminated picture. In addition, when a video signal of a noise contaminated picture is input, the synchronization between such an apparatus and another apparatus connected thereto is lost. Such a situation is not also permitted. To prevent such situations, conventionally, apparatuses that are used in broadcasting stations and professional use customarily output a black picture (a video signal that causes a black screen to be displayed). Such apparatuses may output a blue picture, a green picture, or a pink picture.

In the conventional apparatuses, when they do not output a significant signal, they output a fixed video signal. In the conventional video apparatuses, base band signals that have not been compressed are input, internally processed, and output. Signals that are handled in the apparatuses are only video signals composed of G, B, and R or Y, Cb, and Cr (that are a luminance signal and color difference signals). Thus, on any stage before a video signal is output from a video apparatus, when the video signal is clamped with G=0, B=0, and R=0 or Y=16, Cb=128, and Cr=128 (in the case of an eight-bit digital system), the subsequent video signal is treated as a black picture. As a result, the video apparatus outputs a black picture.

Such an operation applies to the forgoing video camera, video monitor apparatus, video recorder, switcher apparatus, and so forth. This theory also applied to a digital video apparatus that handles a non-compressed digital video signal, an analog video apparatus that handles an analog video signal, and a composite video apparatus that handles a composite video signal.

On the other hand, in the forgoing MPEG2 stream, although value 0 represents no signal (stuffing), it does not represent a black picture. For example, when no signal is input, an EE signal (monitor signal) becomes non-signal state. Likewise, while a tape stops, a reproduction signal becomes non-signal state. Thus, such signals are not decoded as black signals.

However, in recent years, a recording apparatus that inputs a video signal as a non-compressed base band signal, compresses and encodes the video signal with a variable length code corresponding to the MPEG2 system or JPEG (Joint Photographic Experts Group) system, and records the resultant signal to the record medium has been released. In addition, a recording and reproducing apparatus that directly inputs and outputs a data stream that has been compressed and encoded with a variable length code and records and reproduces the data stream has been proposed. In such a recording and reproducing apparatus, a data stream that has been compressed and encoded corresponding to for example the MPEG2 system is directly input thereto and directly output therefrom.

OBJECTS AND SUMMARY OF THE INVENTION

Therefore, an object of the present invention is to provide a signal processing apparatus that outputs a base band signal that causes a black screen or the like to be displayed and a stream that has been decoded to a black signal or the like while the apparatus is not outputting a significant signal.

A first aspect of the present invention is a signal processing apparatus, comprising a stream generating means for generating a predetermined stream, a determining means for determining whether or not an input stream is in an insignificant state, and a stream substituting means for substituting the input stream determined as the insignificant state with the predetermined stream generated by the stream generating means corresponding to the determined result of the determining means.

A second aspect of the present invention is a signal processing method, comprising the steps of generating a predetermined stream, determining whether or not an input stream is in an insignificant state, and substituting the input stream determined as the insignificant state with the predetermined stream generated at the stream generating step corresponding to the determined result at the determining step.

A third aspect of the present invention is a recording and reproducing apparatus, comprising a stream generating means for generating a predetermined stream, a first determining means for determining whether or not an input stream is in an insignificant state, a first stream substituting means for substituting the input stream determined as the insignificant state with the predetermined stream generated by the stream generating means corresponding to the determined result of the first determining means, a recording means for recording the stream that is output from the stream substituting means to a record medium, a reproducing means for reproducing a stream recorded on the record medium, a second determining means for determining whether or not the reproduced stream reproduced by the reproducing means is in an insignificant state, and a second stream substituting means for substituting the reproduced stream determined as the insignificant state with the predetermined stream generated by the stream generating means corresponding to the determined result of the second determining means.

A fourth aspect of the present invention is a recording and reproducing method, comprising the steps of generating a predetermined stream, determining whether or not an input stream is in an insignificant state, substituting the input stream determined as the insignificant state with the predetermined stream generated at the stream generating step corresponding to the determined result for the input stream, recording the stream that is output at the stream substituting step to a record medium, reproducing a stream recorded on the record medium, determining whether or not the reproduced stream reproduced at the reproducing step is in an insignificant state, and substituting the reproduced stream determined as the insignificant state with the predetermined stream generated at the stream generating step corresponding to the determined result for the reproduced stream.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing a fundamental structure of a VCR that records and reproduces a base band signal to and from a magnetic tape as a record medium;

FIG. 2 is a block diagram showing a fundamental structure of a VCR that records and reproduces a stream of which a video signal has been encoded corresponding to the MPEG2 system;

FIG. 3 is a block diagram showing the fundamental structure of a VCR according to the present invention;

FIGS. 4A, 4B, 4C, 4d and 4e are schematic diagrams showing an outlined hierarchical structure of MPEG2 data;

FIG. 5 is a schematic diagram showing the content of data placed in an MPEG2 stream and a bit assignment thereof;

FIG. 6 is a schematic diagram showing the content of data placed in an MPEG2 stream and a bit assignment thereof;

FIG. 7 is a schematic diagram showing the content of data placed in an MPEG2 stream and a bit assignment thereof;

FIG. 8 is a schematic diagram showing the content of data placed in an MPEG2 stream and a bit assignment thereof;

FIG. 9 is a schematic diagram showing the content of data placed in an MPEG2 stream and a bit assignment thereof;

FIG. 10 is a schematic diagram showing the content of data placed in an MPEG2 stream and a bit assignment thereof;

FIG. 11 is a schematic diagram showing the content of data placed in an MPEG2 stream and a bit assignment thereof;

FIG. 12 is a schematic diagram showing the content of data placed in an MPEG2 stream and a bit assignment thereof;

FIG. 13 is a schematic diagram showing the content of data placed in an MPEG2 stream and a bit assignment thereof;

FIG. 14 is a schematic diagram showing the content of data placed in an MPEG2 stream and a bit assignment thereof;

FIG. 15 is a schematic diagram showing the content of data placed in an MPEG2 stream and a bit assignment thereof;

FIGS. 16A and 16B are schematic diagrams for explaining a byte assigned arrangement of data;

FIG. 26 is a schematic diagram showing changed portions of an example of a picture header of a black stream in the case that the color difference format is format is 4:2:0;

FIGS. 27A and 27B are schematic diagrams showing an example of an algorithm for generating picture data with a black stream in the case that the color difference format is 4:2:0;

FIGS. 28a, 28b and 28c are schematic diagrams showing details of examples of SLICE_HEADER, MACROBLOCK_1, and MACROBLOCK_2 of a black stream in the case that the color difference format is 4:2:0;

FIG. 29 is a schematic diagram showing changed portions of an example of a picture header of a black stream in the case that the color difference format is 4:2:2;

FIGS. 30A and 30B are schematic diagrams showing an example of an algorithm for generating picture data with a black stream in the case that the color difference format is 4:2:2;

FIGS. 31A, 31B, and 31C are schematic diagrams showing details of SLICE_HEADER, MACROBLOCK_1, and MACROBLOCK_2 of a black stream in the case that the color difference format is 4:2:2;

FIG. 32 is a schematic diagram showing changed portions of an example of a picture header of a gray stream in the case that the color difference format is 4:2:0;

FIGS. 33A and 33B are schematic diagrams showing an example of an algorithm for generating picture data with a gray stream in the case that the color difference format is 4:2:0;

FIGS. 34A and 34B are schematic diagrams showing details of examples of SLICE_HEADER and MACROBLOCK of a gray stream in the case that the color difference format is 4:2:0;

FIG. 35 is a schematic diagram showing changed portions of an example of a picture header of a gray stream in the case that the color difference format is 4:2:2;

FIGS. 36A and 36B are schematic diagrams showing an example of picture data generated in a gray stream in the case that the color difference format is 4:2:2;

FIGS. 37A and 37B are schematic diagrams showing details of examples of SLICE_HEADER and MACROBLOCK of a gray stream in the case that the color difference format is 4:2:2;

FIGS. 38A, 38B, 38C, and 38D are schematic diagrams showing an outline of an interpolation with a black stream;

FIGS. 40A and 40B are schematic diagrams showing an outline of a second method for changing a particular stream to a black stream;

FIG. 44 is a block diagram showing an outlined structure of an example of an MPEG monitor according to a fifth embodiment of the present invention.

DETAILED DESCRIPTION OF THE PREFERRED EMBODIMENTS

Figure 17:
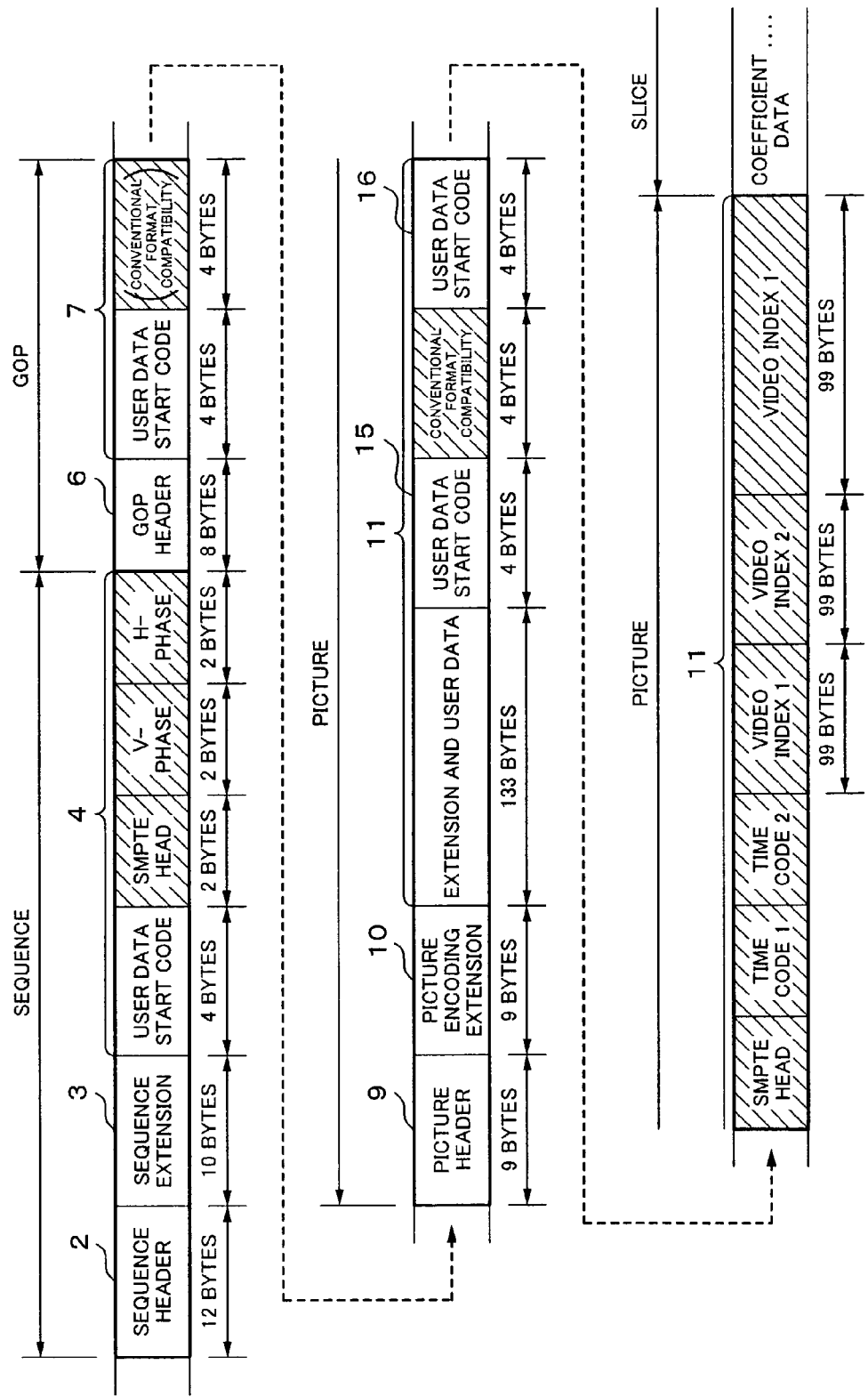
FIG. 17 is a schematic diagram practically showing headers of an MPEG stream according to an embodiment of the present invention.

Next, with reference to FIGS. 1 to 3, the concept of the present invention will be described. FIG. 1 shows a fundamental structure of a digital VCR (Video Cassette Recorder) that records and reproduces a base band signal to and from a magnetic tape as a record medium. When the digital VCR is operated in the recoding mode, a base band signal that is a digital video signal that has not been compressed is input from a terminal 500. The base band signal is supplied to an ECC (Error Correction Coding) encoder 501. In addition, the base band signal is supplied to an EE path 508. The EE path 508 is a monitor path for an input signal. Thereafter, the base band signal is input to a switch circuit 507. The ECC encoder 501 performs a shuffling process and an error correction code encoding process for the supplied base band signal. Thereafter, a recording amplifier 502 encodes the signal supplied from the ECC encoder 501. The recording amplifier 502 supplies the encoded signal to a rotating head (not shown). The rotating head records the encoded signal on a magnetic tape 503.

When the digital VCR is operated in the reproducing mode, a signal is reproduced from the magnetic tape 503 by the rotating head. The reproduced signal is supplied to a reproducing amplifier 504. The reproducing amplifier 504 decodes the reproduced signal into a digital signal. An output signal of the reproducing amplifier 504 is supplied to an ECC decoder 505. The ECC decoder 505 decodes and deshuffles the reproduces signal. The ECC decoder 505 outputs a base band signal. The base band signal is input to the switch circuit 507. The switch circuit 507 selects one of the base band signal that is input from the EE path 508 and the base band signal that is output from the ECC decoder 505. The selected signal is obtained from a terminal 506.

FIG. 2 shows a fundamental structure of a digital VCR that records and reproduces a stream of which a video signal has been encoded corresponding to the MPEG2 system. When the digital VCR is operated in the recording mode, a base band signal is input from a terminal 510. The base band signal is supplied to an MPEG encoder 511. The MPEG encoder 511 encodes the supplied base band signal corresponding to the MPEG2 system and outputs the encoded signal as a stream. The stream that is output from the MPEG encoder 511 is supplied to one input terminal of a selector 513. On the other hand, a stream that has been encoded corresponding to the MPEG2 system is input from a terminal 512. The stream is supplied to the other input terminal of the selector 513.

The selector 513 selects one of the two streams supplied to the input terminals and supplies the selected stream to an ECC encoder 514. An output signal of the selector 513 is supplied to an EE path 523 that is a monitor path for the input signal. Thereafter, the output signal of the selector 513 is input to a switch circuit 522. The ECC encoder 514 performs a shuffling process and an error correction code encoding process for the stream. A recording amplifier 515 encodes the stream and supplies the encoded stream to a rotating head (not shown). The rotating head records the stream on the magnetic tape 516.

When the digital VCR is operated in the reproducing mode, a signal is reproduced from the magnetic tape 516 by the rotating head. The reproduced signal is supplied to a reproducing amplifier 517. The reproducing amplifier 517 decodes the reproduced signal into a digital signal. An output signal of the reproducing amplifier 517 is supplied to an ECC decoder 518. The ECC decoder 518 performs an error correction code decoding process and a deshuffling process for the output signal of the reproducing amplifier 517 and outputs an MPEG2 stream. The output stream of the ECC decoder 518 is input to a switch circuit 522.

The switch circuit 522 selects one of the stream that is input from the EE path 523 and the stream that is output from the ECC decoder 518. The selected stream is directly obtained from a terminal 519. The stream selected by the switch circuit 522 is also supplied to an MPEG decoder 520. The MPEG decoder 520 decodes the supplied stream into a base band signal. The base band signal is obtained from a terminal 521.

When a video signal can be transmitted as a stream between apparatuses, a predetermined number of pictures can be transmitted with a stream whose information amount smaller than a base band signal. When a base band signal is used, whenever it is transmitted, data is expanded and compressed. As a result, the picture quality deteriorates. In contrast, when a stream is used, picture information can be transmitted without a risk of which the picture quality deteriorates. When a picture is not processed, the transmission of a stream is more advantageous than the transmission of a base band signal.

As shown in FIG. 2, an apparatus corresponding to the MPEG system has a portion that processes a stream that has been encoded corresponding to the MPEG system and a portion that processes a base band signal, these portions co-existing with a boundary of the MPEG encoder 511 and the MPEG decoder 520. In the structure shown in FIG. 2, if a non-signal state takes place on the output side, when the luminance component and color difference components of the base band signal that is output from the terminal 521 are changed and fixed to "0" and "128", respectively, the base band signal that is output can be fixed to a signal that causes a black screen to be displayed. On the other hand, when the stream that is output from the terminal 519 is a non-signal state stream, the stream should be substituted with a stream that causes a black screen to be displayed (hereinafter, this stream is referred to as black stream) at least before the terminal 519, more preferably before the MPEG decoder 520.

FIG. 3 shows an example of a fundamental structure of a VCR according to the present invention based on the forgoing concept. In the VCR shown in FIG. 3, a black stream generator 550 is added to the structure shown in FIG. 2. The black stream generator 550 has a no-signal detector 530 and a stream generator 531. The no-signal detector 530 detects a non-signal state. The stream generator 531 generates a black stream.

A stream that is output from an ECC decoder 518 is input to one input terminal of a switch circuit 534 through a switch circuit 532. The switch circuit 532 selects a stream supplied through an EE path 533 or a stream supplied from an ECC decoder 518. A black stream that is generated by the stream generator 531 is input to the other input terminal of the switch circuit 534. The switch circuit 534 is controlled corresponding to a control signal that is output from the no-signal detector 530. When the no-signal detector 530 detects the stream that is output from the ECC decoder 518 or the non-signal state of the stream supplied through the EE path 533, the switch circuit 534 is controlled so that it selects the other input terminal to which the output signal of the stream generator 531 is input.

A delaying circuit (not shown in FIG. 3) may be disposed between the switch circuit 532 and the switch circuit 534. In addition, a delaying circuit (not shown in FIG. 3) may be disposed between the stream generator 531 and the switch circuit 534. With these delaying circuits, the delay due to the detecting process of the no-signal detector 530 can be absorbed. In the forgoing structure, the black stream generator 550 generates a black stream. In the non-signal state, a black stream is output instead of a regular output signal. However, it should be noted that such a stream is just an example. Instead of a black stream, for example a gray stream that causes a gray screen to be displayed may be output instead of a regular output signal.

Next, a digital VCR according to a first embodiment of the present invention will be described. The digital VCR is suitable for use in an environment of a broadcasting station. The VCR according to the first embodiment can record and reproduce video signals in a plurality of different formats.

According to the first embodiment of the present invention, as a compressing system, for example the MPEG2 system is used. The MPEG2 system uses a combination of a motion compensation prediction encoding process and a DCT compressing and encoding process. MPEG2 data is hierarchically structured. FIGS. 4A, 4B, 4C, and 4E show a hierarchical structure of a regular MPEG2 data stream. As shown in FIGS. 4A to 4E, the MPEG2 data is composed of a macro block layer (FIG. 4E), a slice layer (FIG. 4D), a picture layer (FIG. 4C), a GOP layer (FIG. 4B), and a sequence layer (FIG. 4A) disposed in the order from the lowest layer.

As shown in FIG. 4E, the macro block layer is composed of DCT blocks. For each of DCT blocks, a DCT process is performed. The macro block layer is composed of a macro block header and a plurality of DCT blocks. As shown in FIG. 4D, the slice layer is composed of a slice header portion and at least one macro block. As shown in FIG. 4C, the picture layer is composed of a picture header portion and at least one slice. One picture corresponds to one screen. As shown in FIG. 4B, the GOP layer is composed of a GOP header portion, an I picture, a P picture, and a B picture. An I picture corresponds to intra-frame encoding process. A P picture and a B picture correspond to a predictive encoding process.

When an I picture (Intra-coded picture) is encoded, information of only the picture is used. Thus, when an I picture is decoded, only information thereof is used. When a P picture (Predictive-coded picture) is decoded, an I picture or a P picture that has been decoded as a temporally preceding predictive picture (that is a reference picture for obtaining a difference with the current P picture) is used. The difference between the current P picture and the motion compensated predictive pictures is encoded or the current P picture is encoded whichever effective. One of the two processes is selected for each macro block. When a B picture (Bidirectionally predictive-coded picture) is decoded, as predictive pictures (that are reference pictures for obtaining a difference with the current B picture), three types of pictures that are an I picture or a P picture that has been decoded and that is temporally followed by the current B picture, an I picture or a P picture that has been decoded and that is temporally preceded by the current B picture, and an interpolated picture composed of those two pictures are used. The difference between the current B picture and each of the three types of pictures that have been motion-compensated is encoded or the current B picture is intra-encoded whichever most effective. One of the two processes is selected for each macro block.

Thus, there are four types of macro blocks. The first type is an intra-frame encoded macro block. The second type is a forward inter-frame macro block of which the future is predicted from the past. The third type is a backward inter-frame predictive macro block of which the past is predicted from the future. The fourth type is a bidirectional macro block of which the present is predicted from both the directions. All macro blocks contained in an I picture are intra-frame encoded macro blocks. A P picture contains intra-frame encoded macro blocks and forward inter-frame predictive macro blocks. A B picture contains all the four types of macro blocks.

A GOP contains at least one I picture. A GOP may contain neither a P picture, nor a B picture. As shown in FIG. 4A, the sequence layer as the highest layer is composed of a sequence header portion and a plurality of GOPs.

In the MPEG format, a slice is one variable length code sequence. A variable length code sequence is a sequence of which the boundary of data cannot be detected unless a variable length code is correctly decoded.

At the beginning of each of the sequence layer, the GOP layer, the picture layer, and the slice layer, a start code is placed. The start code has a bit pattern that is byte assigned. The start code placed at the beginning of the sequence layer is referred to as sequence header code. The start code placed at the beginning of each of the other layers is referred to as start code. The bit pattern of each sequence header code or each start code is [00 01 01 xx] (in hexadecimal notation). The bit pattern is composed of two-digit pairs. [xx] represents that a bit pattern varies in each layer.

In other words, each of a start code and a sequence header code is composed of four bytes (=32 bits). Corresponding to the value of the fourth byte, the type of information preceded thereby can be identified. Since each of a start code and a sequence header code is byte assigned, the type can be detected by performing a pattern match for four bytes.

The high order four bits of one byte preceded by the start code is an identifier that identifies the content of an extension data area (that will be described later). With the value of the identifier, the content of the extension data can be identified.

The macro block layer and each DCT block of each macro block do not contain an identification code having a bit pattern that is byte assigned.

Next, the header portion of each layer will be described in more detail. On the sequence layer shown in FIG. 4A, at the beginning, a sequence header 2 is placed. The sequence header 2 is followed by a sequence extension 3 and extension and user data 4. The sequence header 2 is preceded by a sequence header code 1. In addition, each of the sequence extension 3 and the user data 4 is preceded by a start code (not shown). The area from the sequence header 2 to the extension and user data 4 is a header portion of the sequence layer.

FIG. 5 shows the content and bit assignment of the sequence header 2. As shown in FIG. 5, the sequence header 2 contains a sequence header code 1, an encoding picture size (composed of number of horizontal pixels and number of vertical lines), an aspect ratio, a frame rate, a bit rate, a VBV (Video Buffering Verifier) buffer size, a quantizer matrix, and so forth that are information designated for each sequence and assigned predetermined numbers of bits.

In FIGS. 5 to 15, some parameters are omitted for simplicity.

As shown in FIG. 6, the sequence extension 3 preceded by the sequence header and the extension start code designates additional data such as a profile, a level, a chroma (chrominance difference) format, and a progressive sequence, and so forth that correspond to the MPEG2 system. As shown in FIG. 7, the extension and user data 4 can contain information of RGB conversion characteristics and display screen size with a sequence indications ( ). In addition, the extension and user data 4 can designate a scalability mode and a layer of scalability with a sequence scalable extension ( ).

The header portion of the sequence layer is followed by a GOP. As shown in FIG. 4B, at the beginning of a GOP, a GOP header 6 and user data 7 are placed. The GOP header 6 and the user data 7 compose the header portion of a GOP. As shown in FIG. 8, the GOP header 6 contains a GOP start code 5, a time code, and flags that represent independency and validity of the GOP. As shown in FIG. 9, the user data 7 contains extension data and user data. At the beginning of each of the extension data and the user data, a start code (not shown) is placed.

The header portion of the GOP layer is followed by a picture. As shown in FIG. 4C, at the beginning of a picture, a picture header 9, a picture encoding extension 10, and extension and user data 11 are placed. At the beginning of the picture header 9, a picture start code 8 is placed. At the beginning of each of the picture encoding extension 10 and the extension and user data 11, a predetermined start code is placed. The area from the picture header 9 to the extension and user data 11 is a header portion of a picture.

As shown in FIG. 10, the picture header 9 contains a picture start code 8 and encoding conditions of the screen. As shown in FIG. 11, the picture encoding extension 10 designates the range of a moving vector in the forward and backward directions and horizontal and vertical directions and a picture structure. In addition, the picture encoding extension 10 designates the accuracy of a DC coefficient of an intra-macro block and selects a VLC type, a linear/nonlinear quantizer scale, and a DCT scanning method.

As shown in FIG. 12, the extension and user data 11 designates quantizer matrixes, spatial scalable parameters, and so forth. They can be designated for each picture. Thus, each picture can be encoded corresponding to characteristics of each screen. In addition, the extension and user data 11 can designate a picture display area. Moreover, the extension and user data 11 can designate copyright information.

The header portion of the picture layer is followed by a slice. As shown in FIG. 4D, at the beginning of a slice, a slice header 13 is placed. At the beginning of the slice header 13, a slice start code 12 is placed. As shown in FIG. 13, the slice start code 12 contains vertical position information of the slice. In addition, the slice header 13 contains extension slice vertical position information, quantizer scale information, and so forth.

The header portion of the slice layer is followed by a macro block (FIG. 4E). In a macro block, a macro block header 14 is followed by a plurality of DCT blocks. As was described above, the macro block header 14 does not contain a start code. As shown in FIG. 14, the macro block header 14 contains relative position information of the macro block. In addition, the macro block header 14 designates a motion compensation mode and detail settings with respect to DCT encoding process.

The macro block header 14 is followed by a DCT block. As shown in FIG. 15, a DCT block contains DCT coefficients encoded with a variable length code and data with respect to the DCT coefficients.

In FIGS. 4A to 4E, solid line delimitations of each layer represent byte assigned data. In contrast, dotted line delimitations of each layer represent non byte assigned data. In other words, as shown in FIG. 16A, in each of higher layers from the sequence layer to the picture layer, each code boundary is byte assigned. In the slice layer, only the slice start code 12 is byte assigned, whereas each macro block can be bit assigned as shown in FIG. 16B. Likewise, in the macro block layer, each DCT block can be bit assigned.

To prevent a signal from being deteriorated in the decoding process and the encoding process, it is preferred to edit encoded data. When a P picture is decoded, a picture that is temporally preceded thereby is required. On the other hand, when a B picture is decoded, a picture that is temporally preceded thereby and a picture that is temporally followed thereby are required. Thus, the editing process cannot be performed in the unit of one frame. From such a point of view, according to the first embodiment of the present invention, one GOP is composed of one I picture.

In addition, since the MPEG2 system uses the variable length code encoding process, the amount of data for one frame is controlled so that data for one frame can be recorded in a record area having a predetermined size. In addition, according to the first embodiment of the present invention, one slice is composed of one macro block and one macro block is matched with a fixed length so that data can be suitably recorded on a magnetic tape.

FIG. 17 shows a practical example of a header of an MPEG stream according to the first embodiment of the present invention. As is clear from FIGS. 4A to 4E, a header portion of each of the sequence layer, the GOP layer, the picture layer, the slice layer, and the macro block layer is placed at the beginning thereof. FIG. 17 shows an example of a data arrangement that starts from the sequence header portion.

At the beginning, the sequence header 2 of 12 bytes is placed. The sequence header 2 is followed by the sequence extension 3 of 10 bytes. The sequence extension 3 is followed by the extension and user data 4. At the beginning of the extension and user data 4, a user data start code of four bytes is placed. The user data start code is followed by a user data area. The user data area contains information corresponding to the SMPTE (Society of Motion Pictures and Television Engineers) standard.

The header portion of the sequence layer is followed by a header portion of the GOP layer. At the beginning of the GOP layer, a GOP header 6 of eight bytes is placed. The GOP header 6 is followed by extension and user data 7. At the beginning of the extension and user data 7, a user data start code of four bytes is placed. The user data start code is followed by a user data area. The user data area contains information necessary for compatibility with another conventional video format.

The header portion of the GOP layer is followed by a header portion of the picture layer. At the beginning of the picture layer, a picture header 9 of nine bytes is placed. The picture header 9 is followed by a picture encoding extension 10 of nine bytes. The picture encoding extension 10 is followed by extension and user data 11. The first 133 bytes of the extension and user data 11 are extension and user data. The 133-byte area is followed by a user data start code 15 of four bytes. The user data start code 15 is followed by information necessary for compatibility with another conventional video format. The information is followed by a user data start code 16. The user data start code 16 is followed by data corresponding to the SMPTE standard. The header portion of the picture layer is followed by a slice.

Next, a macro block will be described in detail. A macro block contained in the slice layer is a set of a plurality of DCT blocks. An encoded sequence of DCT blocks is composed by encoding pairs of runs and levels. A run represents the number of zero coefficients of quantized DCT coefficients. A level represents a non-zero coefficient immediately preceded by the run. A byte assigned identification code is not added to a macro block and a DCT block of a macro block.

A macro block is a lattice element of which a screen (picture) is divided into 16 pixels×16 lines. A slice is composed of macro blocks connected in the horizontal direction. When two slices are successive, the last macro block of the earlier slice and the first macro block of the later slice are successive. Macro blocks of two successive slices are prohibited from overlapping. When the size of a screen is designated, the number of macro blocks per screen is uniquely designated.

The number of macro blocks in the vertical direction on the screen is denoted by mb_height. Likewise, the number of macro blocks in the horizontal direction on the screen is denoted by mb_width. The coordinates of a macro block on the screen are represented by mb_row and mb_column. mb_row represents the vertical macro block position number counted from the upper end of the screen, whereas mb_column represents the horizontal macro block position number counted from the left end of the screen. To represent the position of a macro block on the screen with one variable, macroblock_address is defined as follows.

macroblock_address=mb_row×mb_width+mb_column

Slices and macro blocks in a stream should be in the order of smaller macroblock_address. In other words, a stream is transmitted from the top to the bottom and from the left to the right on the screen.

In the MPEG system, one slice is composed of one stripe (16 lines). The variable length code encoding process starts from the left end of the screen and ends at the right end of the screen. Thus, when an MPEG elementary stream that has been recorded by a VCR is reproduced at high speed, reproduced portions concentrate on the left end of the screen. Thus, the screen cannot be equally updated. In addition, since the position of data on a tape cannot be predicted, when a tape pattern is traced at predetermined intervals, the screen cannot be equally updated. In addition, when an error takes place at only one position, the error affects up to the right end of the screen. Thus, until the next slice header is detected, the apparatus cannot be recovered from the error. To solve such a problem, one slice is composed of one macro block.

Figure 18A:
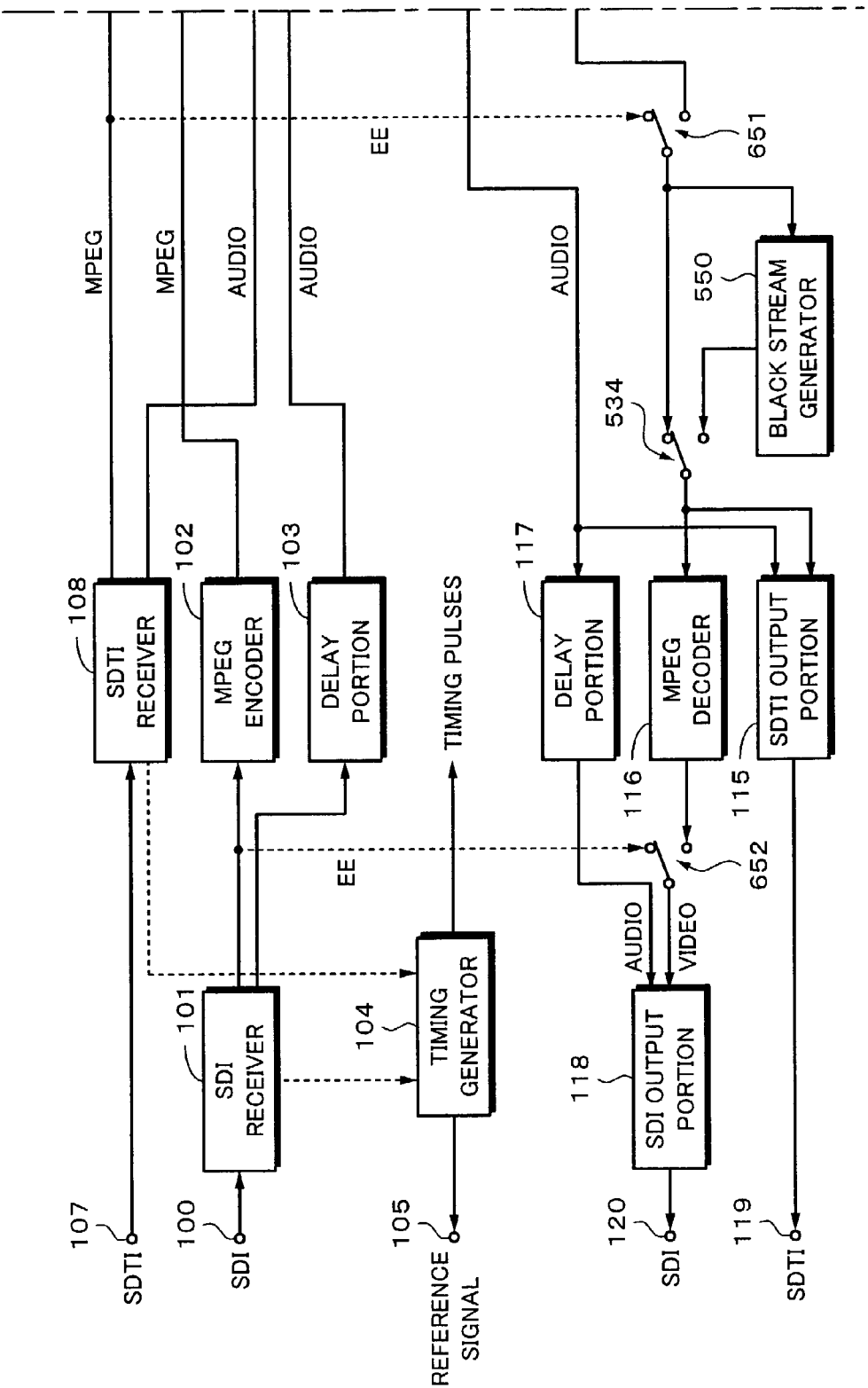
FIG. 18 is a block diagram showing an example of the structure of a recording and reproducing apparatus according to an embodiment of the present invention.

FIG. 18 shows an example of the structure of a recording and reproducing apparatus according to the first embodiment of the present invention. When the apparatus is operated in the recording mode, a digital signal is input from a terminal 100 and supplied to an SDI (Serial Data Interface) receiver 101. The SDI is an interface that has been prescribed by the SMPTE (Society of Motion Picture and Television Engineers). The SDI is used to transmit a (4:2:2) component video signal, a digital audio signal, and additional data. The SDI receiver 101 extracts a digital video signal and a digital audio signal from the input digital signal. The digital video signal (base band signal) is supplied to an MPEG encoder 102. The digital audio signal is supplied to an ECC encoder 109 through a delay portion 103. The delay portion 103 removes the time difference between the digital audio signal and the digital video signal.

An output signal of the SDI receiver 101 is also supplied to a switch circuit 550 through an EE path. When the EE path is selected by a switch circuit 652, the digital video signal that is output from the SDI receiver 101 is supplied to an SDI output portion 118 (that will be described later) through the EE path and the switch circuit 652. The digital video signal is obtained from an output terminal 120.

In addition, the SDI receiver 101 extracts a synchronous signal from the input digital signal and supplies the extracted synchronous signal to a timing generator 104. An external synchronous signal may be input to the timing generator 104 through a terminal 105. The timing generator 104 generates timing pulses corresponding to a designated signal that is one of the input synchronous signal and a synchronous signal that is supplied from an SDTI receiver 108 (that will be described later). The generated timing pulses are supplied to each portion of the recording and reproducing apparatus.

The MPEG encoder 102 performs a DCT (Discrete Cosine Transform) process for the input video signal, generates coefficient data, and encodes it with a variable length code. The variable length code (VLC) data that is output from the MPEG encoder 102 is an MPEG2 elementary stream (ES). The output data of the MPEG encoder 102 is supplied to one input terminal of a recording side multi-format converter (hereinafter referred to as MFC) 106.

On the other hand, SDTI (Serial Data Transport Interface) format data is input through an input terminal 107. The SDTI receiver 108 synchronously detects the signal of the data. The signal is temporarily stored to a buffer. The elementary stream is extracted from the signal. The extracted elementary stream is supplied to another input terminal of the recording side MFC 106. A synchronous signal that is detected by the SDTI receiver 108 is supplied to the forgoing timing generator 104.

An output signal of the SDTI receiver 108 is also supplied to a switch circuit 651 through the EE path. When the EE path side is selected by the switch circuit 651, an output signal of the SDTI receiver 108 is supplied to the black stream generator 550 and a first input terminal of the switch circuit 534.

According to the first embodiment, to transmit for example an MPEG ES (MPEG Elementary Stream), SDTI (Serial Data Transport Interface—CP (Content Package) is used. The ES is a 4:2:2 component signal. In addition, as was described above, an ES is a stream that is composed of only I pictures and that has the relation of 1 GOP=1 picture. In the SDTI-CP format, an MPEG ES is divided into data units that can be accessed. In addition, an MPEG ES is packed to packets in each frame. In the SDTI-CP, a sufficient transmission band (at 27 MHz or 36 MHz of clock rate or 270 Mbps or 360 Mbps of stream bit rate) is used. Thus, in one frame period, an ES can be transmitted as a burst.

In other words, between SAV and EAV in one frame period, system data, a video stream, an audio stream, and AUX data are placed. Thus, data is not placed in all one frame period. In other words, data is placed as a burst in a predetermined period from the beginning of the frame. At the boundary of a frame, an SDTI-CP stream (video and audio) can be switched in a stream state. When a content signal uses an SMPTE time code as a clock reference, the SDTI-CP has a scheme that synchronizes audio data and video data. In addition, a format that allows SDTI-CP and SDI to coexist has been prescribed.

As with the case that a TS (Transport Stream) is transmitted, since an interface that uses the forgoing SDTI-CP does not require the encoder and the decoder to use a VBV (Video Buffer Verifier) buffer and TBs (Transport Buffers). Thus, in this case, the delay of the ES can be decreased. In addition, since the SDTI-CP allows an TS to be transmitted at very high speed, the delay thereof can be further decreased. Thus, when there is a synchronization that allows the entire broadcasting station to be managed, the SDTI-CP can be effectively used.

In addition, the SDTI receiver 108 extracts a digital audio signal from the input SDTI-CP stream. The extracted digital audio signal is supplied to an ECC encoder 109.

The recording side MFC 106 has a selector and a stream converter as internal devices. The recording side MFC 106 is disposed in for example one integrated circuit. Next, a process performed by the recording side MFC 106 will be described. An MPEG ES supplied from the MPEG encoder 102 or an MPEG ES supplied from the SDTI receiver 108 is selected by the selector. The selected MPEG ES is supplied to the stream converter.

The stream converter rearranges DCT coefficients of each MPEG2 DCT block to those of each frequency component in a plurality of DCT blocks of one macro block. In addition, when one slice of an elementary stream is one stripe, the stream converter forms one slice with one macro block. Moreover, the stream converter limits the maximum length of variable length data of one macro block. To do that, the stream converter sets high order DCT coefficients to 0. The converted elementary stream arranged by the recording side MFC 106 is supplied to the ECC encoder 109.

A main memory (not shown) that has a large storage capacity is connected to the ECC encoder 109. The ECC encoder 109 has a packing and shuffling portion, an audio outer code encoder, a video outer code encoder, an inner code encoder, an audio shuffling portion, a video shuffling portion, and so forth as internal devices. In addition, the ECC encoder 109 contains a circuit that adds an ID to each sync block and a synchronous signal adding circuit. The ECC encoder 109 is composed of for example one integrated circuit.

According to the first embodiment of the present invention, as an error correction code for video data and audio data, a product code is used. A product code is used to encode a two-dimensional array of video data or audio data with an outer code in the vertical direction and encode the two-dimensional array with an inner code in the horizontal direction. Thus, data symbols are dually encoded. As an outer code and an inner code, the Reed-Solomon code is used.

Next, a process of the ECC encoder 109 will be described. Since video data of an elementary stream has been encoded with a variable length code, the length of data of each macro block varies. The packing and shuffling portion packs each macro block in a fixed length frame. At that point, a portion that overflows from the fixed length frame is successively packed to other blank areas each having the size of the fixed length frame.

In addition, system data that contains information of a picture format, a shuffling pattern version, and so forth is supplied from a system controller 121 (that will be described later). The system data is supplied from an input terminal (not shown). The system data is supplied to the packing and shuffling portion. As with picture data, a recording process for the system data is performed by the packing and shuffling portion. The packing and shuffling portion performs a shuffling process for rearranging macro blocks of one frame in the scanning order so as and dispersing record positions of macro blocks of one frame on the tape. Even if data is partially reproduced in a shuttle reproducing mode, since the data is shuffled, the update ratio of pictures can be improved.

The video data and the system data (unless otherwise specified, video data that contains system data is referred to as video data) are supplied from the packing and shuffling portion to the video outer code encoder that encodes video data with an outer code. The video outer code encoder adds an outer code parity to the video data. The video shuffling portion rearranges sync blocks of a plurality of ECC blocks so as to shuffle them. Since sync blocks are shuffled, an error can be prevented from concentrating on a particular ECC block. The shuffling process performed by the shuffling portion may be referred to as interleave. An output signal of the video shuffling portion is written to the main memory.

On the other hand, as was described above, a digital audio signal that is output from the SDTI receiver 108 or the delay portion 103 is supplied to the ECC encoder 109. According to the first embodiment of the present invention, a non-compressed digital audio signal is handled. Instead, a digital audio signal may be input through an audio interface. In addition, audio AUX is supplied from an input terminal (not shown). Audio AUX is auxiliary data. Audio AUX contains information with respect to audio data such as a sampling frequency of audio data. Audio AUX is added to audio data. Audio AUX is treated in the same manner as audio data.

Audio data to which audio AUX has been added (unless otherwise specified, audio data that contains audio AUX is also referred to as audio data) is supplied to the audio outer code encoder that encodes the audio data with an outer code. An output signal of the audio outer code encoder is supplied to the audio shuffling portion. The audio shuffling portion performs a shuffling process for the audio data. The audio data is shuffled in each sync block and in each channel.

An output signal of the audio shuffling portion is written to the main memory. As was described above, the output signal of the video shuffling portion has been also written to the main memory. The main memory mixes the audio data and the video data as data of one channel.

Data is read from the main memory. An ID that represents a sync block number is added to the data that is read from the main memory. The resultant data is supplied to the inner code encoder. The inner code encoder encodes the supplied data with an inner code. A synchronous signal is added to each sync block of the output signal of the inner code encoder. As a result, record data as a sequence of sync blocks is formed.

Record data that is output from the ECC encoder 109 is supplied to an equalizer 110 that has a recording amplifier and so forth. The equalizer 110 converts the record data into a record RF signal. The record RF signal is supplied to a rotating drum 111 that has a rotating head. The record RF signal is recorded on a magnetic tape 112. In reality, a plurality of magnetic heads that have different azimuths and that form adjacent tracks are disposed on the rotating drum 111.

When necessary, a scrambling process may be performed for record data. When record data is recorded, it may be digitally modulated. In addition, partial response class 4 and Viterbi code may be used. The equalizer 110 contains both a recording side structure and a reproducing side structure.

FIGS. 19A, 19B, 19C, 19D, and 19E show an example of the format of tracks formed on a magnetic tape by the forgoing rotating head. In the example, video data and audio data for one frame are recorded on four tracks. One segment is composed of two tracks having different azimuths. In other words, four tracks are composed of four segments. A pair of tracks that compose one segment are assigned track numbers [0] and [1] corresponding to azimuths. Video sectors are recorded on both ends of each track. Audio sectors are formed between video sectors. FIGS. 19A to 19E show an arrangement of sectors on a tape.

In the example, audio data of four channels can be handled. A1 to A4 represent channels 1 to 4 of audio data, respectively. Audio data of each channel is varied in each segment. In the example, data of four error correction blocks per track is interleaved and recorded as an upper side sector and a lower side sector.

A system area (SYS) in which system data is recorded is formed in a lower side video sector. System areas are alternately formed at the beginning position and the end position of lower side video sectors on each track.

Figure 19A:
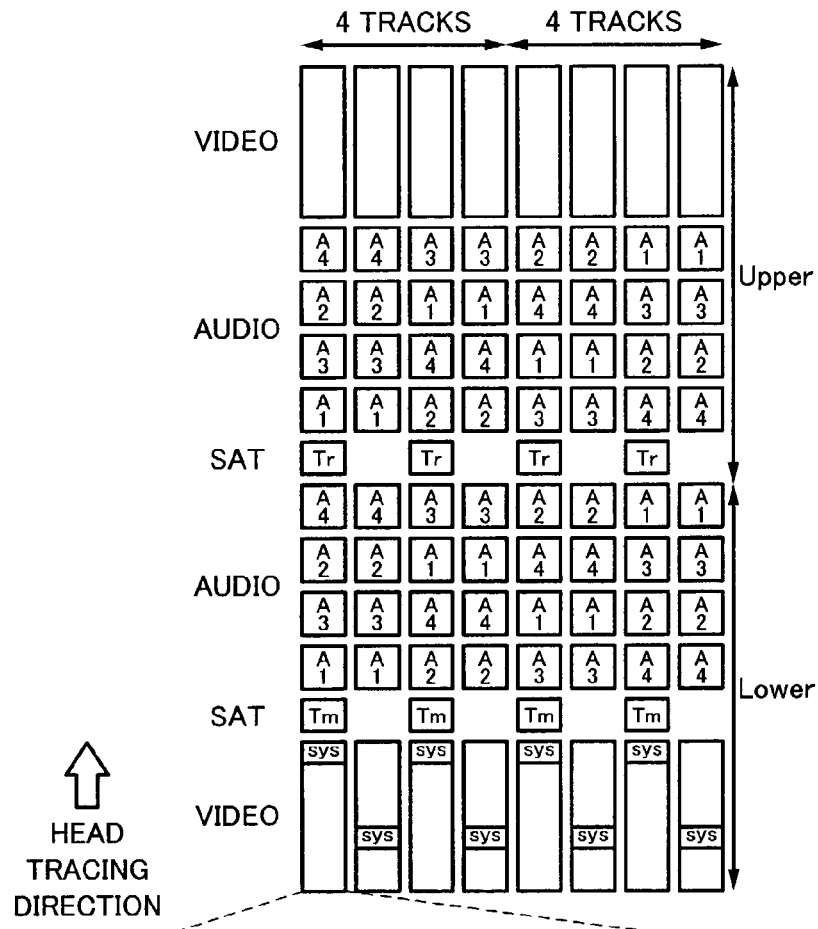
FIGS. 19A, 19B, 19C, and 19D are schematic diagrams showing an example of a track format formed on a magnetic tape.

In FIG. 19A, SAT is an area in which a servo lock signal is recorded. A gap is formed between adjacent record areas.

FIG. 19A shows an example of which data per frame is recorded with four tracks. However, depending on the format of which data is recorded and reproduced, data per frame can be recorded with eight tracks, six tracks, or the like.

Figure 19B:
Figure 19C:
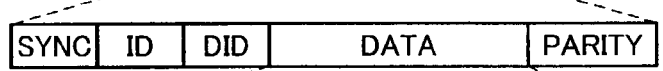

As shown in FIG. 19B, data recorded on a tape is composed of a plurality of blocks that are divided at equal intervals. These blocks are referred to as sync blocks. FIG. 19C shows an outline of the structure of a sync block. One sync block is composed of a sync pattern, an ID, a DID, a data packet, and an error correction inner code parity. The sync pattern is used to synchronously detect the sync block. The ID identifies the sync block. The DID represents the content of data preceded by the ID. Data of each sync block is treated as a packet. In other words, the minimum unit of data that is recorded or reproduced is one sync block. A video sector is composed of many sync blocks that are arranged (FIG. 19B).

Figure 19D:
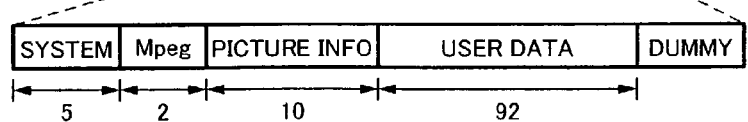

FIG. 19D shows the data structure of an example of the system area SYS. The data area of a sync block shown in FIG. 19C contains system data of five bytes, an MPEG header of two bytes, picture information of 10 bytes, and user data of 92 bytes placed in the order from the beginning.

The system data contains information that represents whether a switching point is present or absent, a position thereof, a video format (a frame frequency, an interleave method, an aspect ratio, and so forth), shuffling version information, and so forth. In addition, the system data contains an appropriate level (six bits) of a recorded MPEG ES syntax.

The MPEG header contains MPEG header information necessary for the shuttle reproducing operation. The picture information contains information necessary for the compatibility with another digital VCR. The user data contains a recorded date (year, month, and day), a cassette number, and so forth.

Returning to FIG. 18, when the VCR is operated in the reproducing mode, a reproductions signal is reproduced from the magnetic tape 112 by the rotating drum 111. The reproduction signal is supplied to a reproducing side structure of the equalizer 110 that contains a reproducing amplifier and so forth. The equalizer 110 performs an equalizing process and a waveform trimming process for the reproduction signal. When necessary, the equalizer 110 performs a digital demodulating process, a Viterbi decoding process, and so forth for the reproduction signal. An output signal of the equalizer 110 is supplied to an ECC decoder 113.

The ECC decoder 113 performs a reverse process of the ECC encoder 109. The ECC decoder 113 contains a main memory, an inner code decoder, an audio deshuffling portion, a video deshuffling portion, and an outer code decoder. The main memory has a large storage capacity. In addition, the ECC decoder 113 contains a deshuffling and depacking portion and a data interpolator for video data. Likewise, the ECC decoder 113 contains an AUX separator and a data interpolator for audio data. The ECC decoder 113 is composed of for example one integrated circuit.

Next, a process of the ECC decoder 113 will be described. The ECC decoder 113 synchronously detects a sync block, detects a synchronous signal added at the beginning of the sync block, and extracts the sync block. Each sync block of reproduction data is supplied to the inner code decoder. The inner code decoder corrects an error of the sync block with an inner code. An ID interpolating process is performed for an output signal of the inner code decoder. An ID of a sync block treated as an error with an inner code (for example, a sync block number) is interpolated. Reproduction data of which an ID has been interpolated is separated into video data and audio data.

As was described above, video data is composed of DCT coefficient data, which was generated in the MPEG intra encoding process, and system data. Audio data is composed of PCM (Pulse Code Modulation) data and audio AUX.

The separated audio data is supplied to the audio deshuffling portion. The audio deshuffling portion performs a reverse process of the shuffling process performed by the recording side shuffling portion. An output signal of the deshuffling portion is supplied to the audio outer code decoder. The audio outer code decoder corrects an error of the audio data with an outer code. The audio outer code decoder outputs audio data whose error has been corrected. When data has an error that cannot be corrected, an error flag is set to the data.

The audio AUX separator separates audio AUX from the output signal of the audio outer code decoder. The separated audio AUX is output from the ECC decoder 113 (the route is omitted). The audio AUX is supplied to for example the system controller 121 that will be described later. Audio data is supplied to the data interpolator. The data interpolator interpolates a sample that has an error. As an example of the interpolating method, an average value interpolating method or a preceding value holding method is used. In the average value interpolating method, a sample is interpolated with an average value of samples temporally preceded and followed thereby. In the preceding value holding method, the value of a preceding correct sample is held.

Output data of the data interpolator is audio data that is output from the ECC decoder 113. Audio data that is output form the ECC decoder 113 is supplied to a delay portion 117 and an SDTI output portion 115. The delay portion 117 is disposed so as to absorb the delay of video data processed in an MPEG decoder 116 that will be described later. Audio data that is supplied to the delay portion 117 is delayed for a predetermined time period and supplied to an SDI output portion 118.

The separated video data is supplied to the deshuffling portion. The deshuffling portion performs a reverse process of the shuffling process performed on the recording side. The deshuffling portion deshuffles each sync block shuffled by the shuffling portion on the recording side. Output data of the deshuffling portion is supplied to the outer code decoder. The outer code decoder corrects an error of the data with an outer code. When the data has an error that cannot be corrected with an outer code, a flag that represents such an error is set to the data.

Output data of the outer code decoder is supplied to the deshuffling and depacking portion. The deshuffling and depacking portion deshuffles each macro block that has been shuffled by the packing and shuffling portion on the recording side. In addition, the deshuffling and depacking portion depacks data that has been packed when the data has been recorded. In other words, the deshuffling and depacking portion restores each macro block that has been packed to an original variable length code. In addition, the deshuffling and depacking portion separates system data from the depacked data. The system data is output from the ECC decoder 113 and supplied to the system controller 121 that will be described later.

Output data of the deshuffling and depacking portion is supplied to the data interpolator. The data interpolator corrects an error of data to which the error flag has been set. In other words, before data is converted, if it contains an error, DCT coefficients of frequency components after the error position cannot be restored. To solve such a problem, data at the error position is substituted with an end-of-block code (EOB). In addition, DCT coefficients of frequency components after the error position are set to zero. Likewise, when the VCR is operated in the shuttle reproducing mode, only DCT coefficients corresponding to the length of a sync block are restored. The coefficients that exceed the length of a sync block are substituted with zero data. In addition, when a header added at the beginning of video data has an error, the data interpolator also performs a process for restoring a header (a sequence header, a GOP header, a picture header, user data, or the like).

Since DCT coefficients are arranged from DC components and low frequency components to high frequency components over DCT blocks, even if DCT coefficients are ignored after a particular position. DC components and lower frequency components can be equally placed in each DCT block that composes a macro block.

Video data that is output from the data interpolator of the ECC decoder 113. Output data of the ECC decoder 113 is supplied to a multi-format converter 114 on the reproducing side (hereinafter referred to as reproducing side MFC). The reproducing side MFC 114 performs a reverse process of the forgoing recording side MFC 106. The reproducing side MFC 114 contains a stream converter. The reproducing side MFC 114 is composed of for example one integrated circuit.

The stream converter performs a reverse process of the recording side stream converter. In other words, the stream converter rearranges DCT coefficients of each frequency component over DCT blocks into those of each DCT block. Thus, the reproduction signal is converted into an MPEG2 elementary stream.

As with the recording side, a sufficient transmission rate (band width) is assured for the input and output of the stream converter corresponding to the maximum length of macro blocks. When the length of macro blocks (slices) is not limited, it is preferred to assure a band width three times larger than the pixel rate.

Output data of the stream converter is output data of the reproducing side MFC 114. Output data of the reproducing side MFC 114 is input to one input terminal of the switch circuit 534 through the switch circuit 651 and supplied to the black stream generator 550. The switch circuit 651 selects the EE path or the path of the reproducing side MFC 114. As was described above, the black stream generator 550 has the no-signal detector 530 and the stream generator 531. Output data of the black stream generator 550 is input to another input terminal of the switch circuit 534. One of the input terminals of the switch circuit 534 is selected corresponding to a control signal that is output from the no-signal detector 530. Output data of the switch circuit 534 is supplied to an SDTI output portion 115 and an MPEG decoder 116.

The MPEG decoder 116 decodes an elementary stream and outputs video data. In other words, the MPEG decoder 116 performs a dequantizing process and an inverse DCT process. The decoded video data is supplied to the SDI output portion 118 through a switch circuit 652. The switch circuits 652 selects the EE path or the path of MPEG decoder 116. As was described above, audio data separated from video data by the ECC decoder 113 has been supplied to the SDI output portion 118 through the delay portion 117. The SDI output portion 118 maps the supplied video data and audio data in the SDI format and outputs a stream having a data structure of the SDI format. The stream is output from the SDI output portion 118 to the outside of the apparatus through an output terminal 120.

On the other hand, as was described above, audio data separated from the video data by the ECC decoder 113 has been supplied to the SDTI output portion 115. The SDTI output portion 115 maps video data and audio data supplied as an elementary stream in the SDTI format and outputs a stream having a data structure of the SDTI format. The converted stream is output to the outside of the apparatus through an output terminal 119.

In FIG. 18, the system controller 121 is composed of for example a microcomputer. When a switch or the like disposed on a control panel (not shown) is operated, a control signal corresponding to the operation is supplied to the system controller 121. Corresponding to the control signal, the recording operation and the reproducing operation of the recording and reproducing apparatus are controlled by the system controller 121.

The control panel may have a displaying portion (not shown) composed of an LCD (Liquid Crystal Display). The display portion displays each state and so forth of the recording and reproducing apparatus corresponding to a display control signal generated by the system controller 121.

While the servo 122 is communicating with the system controller 121, the servo 122 performs a traveling control for the magnetic tape 112 and a drive control for a rotating drum 111.

Figure 20A:
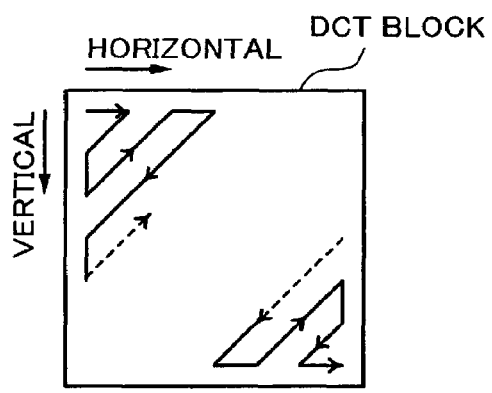
FIGS. 20A and 20B are schematic diagrams for explaining an output method of a video encoder and a variable length code encoding process.
Figure 20B:
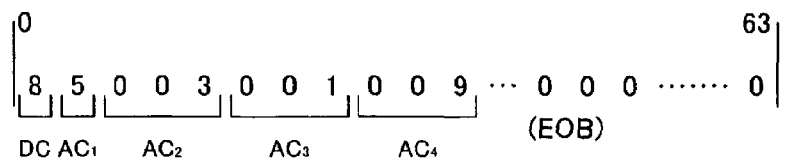

FIG. 20A shows the order of DCT coefficients of video data that are output from the DCT circuit of the MPEG encoder 102. That applies to an MPEG ES that is output from the SDTI receiver 108. Next, an example of output data of the MPEG encoder 102 will be described. In a DCT block, DCT coefficients are zigzag-scanned starting from a DC component at the upper left position in the direction of which higher horizontal and vertical spatial frequencies become higher. As a result, as shown in FIG. 20B, a total of 64 DCT coefficients (8 pixels×8 lines) are arranged in the order of frequency components.

The VLC portion of the MPEG encoder encodes the DCT coefficients with a variable length code. In other words, the first coefficient is fixed as a DC component. The subsequent components (AC components) are assigned code symbols corresponding to the run of zeros and the level followed thereby. Thus, variable length code symbols of coefficient data of AC components are arranged from low frequency (order) components to high frequency (order) components as $AC_1, AC_2, AC_3, \ldots$. The elementary stream contains DCT coefficients as variable length code symbols.

The recording side stream converter of the recording side MFC 106 rearranges DCT coefficients of the supplied signal. In other words, DCT coefficients zigzag-scanned and arranged in the order of frequency components are rearranged in the order of frequency components over DCT blocks that compose a macro block.

Figure 21A:
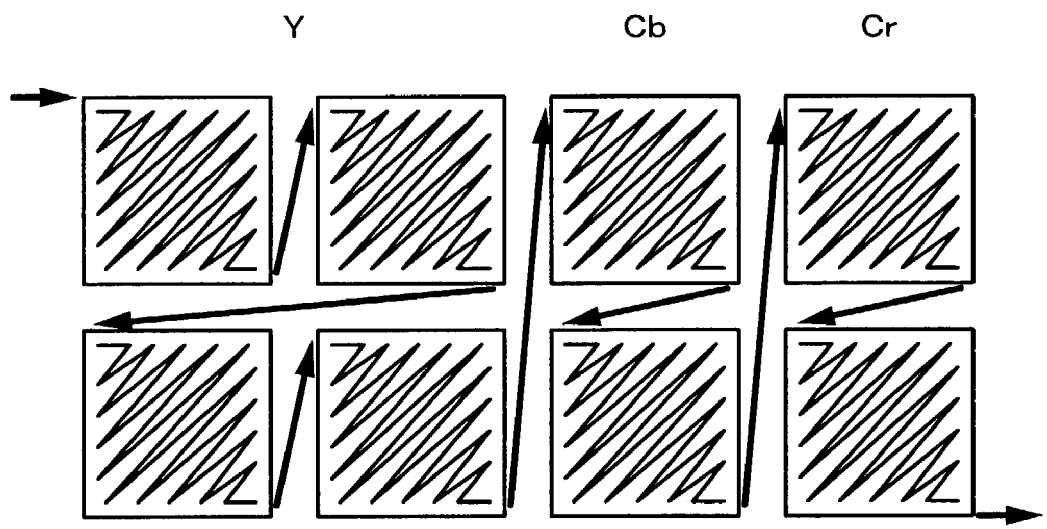
FIGS. 21A and 21B are schematic diagrams for explaining a rearrangement of the sequence of output data of the video encoder.
Figure 21B:
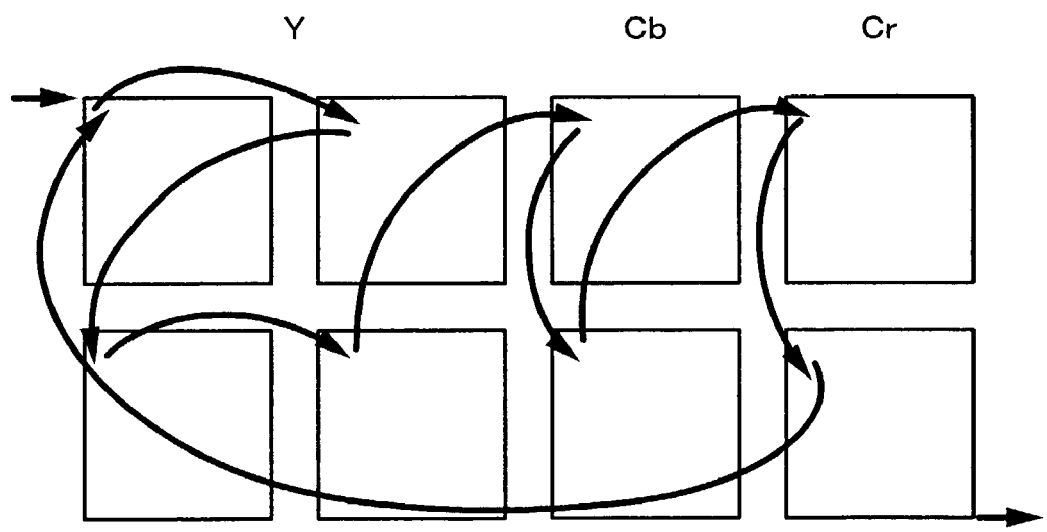

FIGS. 21A and 21B show DCT coefficients rearranged by the recording side stream converter. In the case of a (4:2:2) component signal, one macro block is composed of four DCT blocks ($Y_1, Y_2, Y_3$, and $Y_4$) of the luminance signal Y and four DCT blocks ($Cb_1, Cb_2, Cr_1$, and $Cr_2$) of the chrominance signals Cb and Cr.

As was described above, the MPEG encoder 102 zigzag-scans DCT coefficients as prescribed in the MPEG2 standard. As shown in FIG. 21A, in each DCT block, DCT coefficients are arranged from a DC component and low frequency components to high frequency components. After one DCT block has been scanned, the next DCT block is scanned. In the same manner, DCT coefficients are arranged.

In other words, in a macro block, DCT coefficients are arranged from a DC component and low frequency components to high frequency components for each of the DCT blocks $Y_1$, $Y_2$, $Y_3$, and $Y_4$ and the DCT blocks $Cb_1$, $Cr_1$, $Cb_2$, and $Cr_2$. DCT coefficients are encoded as variable length code symbols so that code symbols [DC, $AC_1$, $AC_2$, $AC_3$, . . . ] are assigned to pairs of runs and levels.

The recording side stream converter temporarily reads a variable length code of DCT coefficients that have been encoded therewith, detects the delimiter of each coefficient, and groups DCT coefficients corresponding to each frequency component over the DCT blocks that compose the macro block as shown in FIG. 21B. First of all, DC components of eight DCT blocks of the macro block are grouped. Thereafter, AC coefficient components of the lowest frequency component of the eight DCT blocks are grouped. Likewise, AC coefficients of each frequency component of the eight DCT blocks are grouped. In such a manner, coefficients data over the eight DCT blocks are rearranged.

Thus, the coefficient data is rearranged as DC ($Y_1$), DC ($Y_2$), DC ($Y_3$), DC ($Y_4$), DC ($Cb_1$), DC ($Cb_2$), DC ($Cr_1$), DC ($Cr_2$), $AC_1$ ($Y_1$), $AC_1$ ($Y_2$), $AC_1$ ($Y_3$), $AC_1$ ($Y_4$), $AC_1$ ($Cb_1$), $AC_1$ ($Cb_2$), $AC_1$ ($Cr_1$), $AC_1$ ($Cr_2$), . . . where DC, $AC_1$, $AC_2$, . . . are variable length code symbols assigned to pairs of runs and levels as was described with reference to FIG. 20B.

The converted elementary stream of which the order of coefficient data has been rearranged by the recording side stream converter is supplied to the packing and shuffling portion of the ECC encoder 109. The length of data of a macro block of a converted elementary stream is the same as that of a non-converted elementary stream. The MPEG encoder 102 controls a bit rate so that the length of each GOP (one frame) is fixed. However, the length of each macro block varies. The packing and shuffling portion matches data of each macro block with a fixed length frame.

Figure 22A:
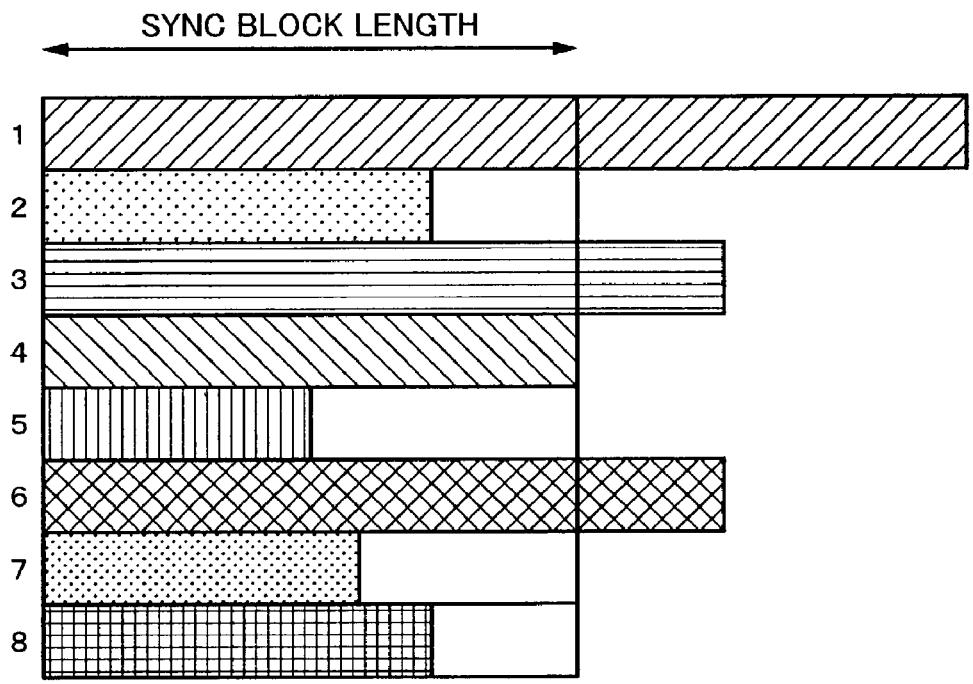
FIGS. 22A and 22B are schematic diagrams for explaining a process that packs data whose sequence has been rearranged to sync blocks.
Figure 22B:
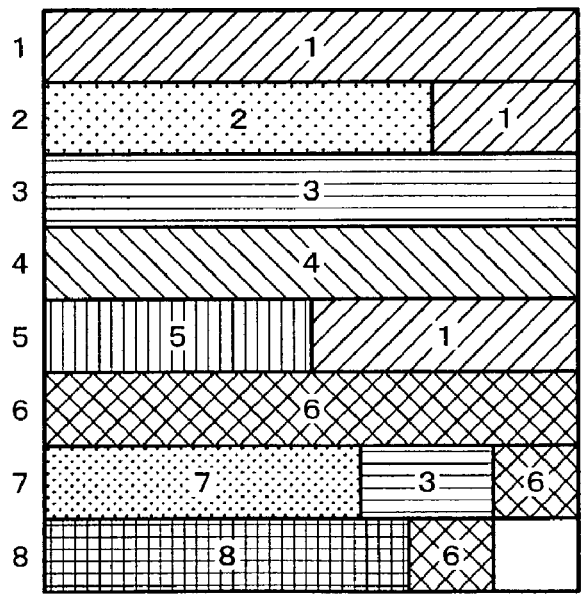

FIGS. 22A and 22B show a packing process for macro blocks performed by the packing and shuffling portion. Macro blocks are matched with the fixed data length frame. The data length of the frame is matched with the data length of a sync block that is the minimum unit of data that is recorded and reproduced. This process is performed so as to simplify the shuffling and error correction code encoding process. In FIGS. 22A and 22B, for simplicity, it is assumed that one frame contains eight macro blocks.

As shown in FIG. 22A, when data is encoded with a variable length code, the lengths of eight macro blocks differ from each other. In the example, when the length of each macro block is compared with the length of a data area of one sync block as the fixed length frame, the length of each of data of macro block #1, data of macro block #3, and data of macro block #6 is larger than the length of the fixed length frame. The length of each of data of macro block #2, data of macro block #5, data of macro block #7, and data of macro block #8 is smaller than the length of the fixed length frame. The length of data of macro block #4 is equal to the length of the fixed length frame.

Each macro block is packed to the fixed length frame that has the length of one sync block by the packing process. Data is equally packed because the amount of data that is generated in one frame period is controlled to a fixed amount. As shown in FIG. 22B, when the length of a macro block is larger than the length of one sync block, the macro block is divided at the position corresponding to the length of one sync block. The portion that exceeds (overflows) from the length of one sync block is packed after blank macro block(s) whose length is smaller than the length of one sync block.

In the example shown in FIG. 22B, the overflow portion of macro block #1 is packed after macro block #2. When the length of the packed portion of macro block #2 exceeds the length of one sync block, the overflow portion of macro block #1 is packed after macro block #5. Thereafter, the overflow portion of macro block #3 is packed after macro block #7. The overflow portion of macro block #6 is packed after macro block #7. The overflow portion of macro block #7 is further packed after macro block #8. In such a manner, each macro block is packed to the fixed length frame that has the length of one sync block.

The length of the variable length data of each macro block can be predetermined by the recording side stream converter. Thus, the packing portion can detect the end of data of a macro block without need to decode VLC data and check the content thereof.

Figure 23:
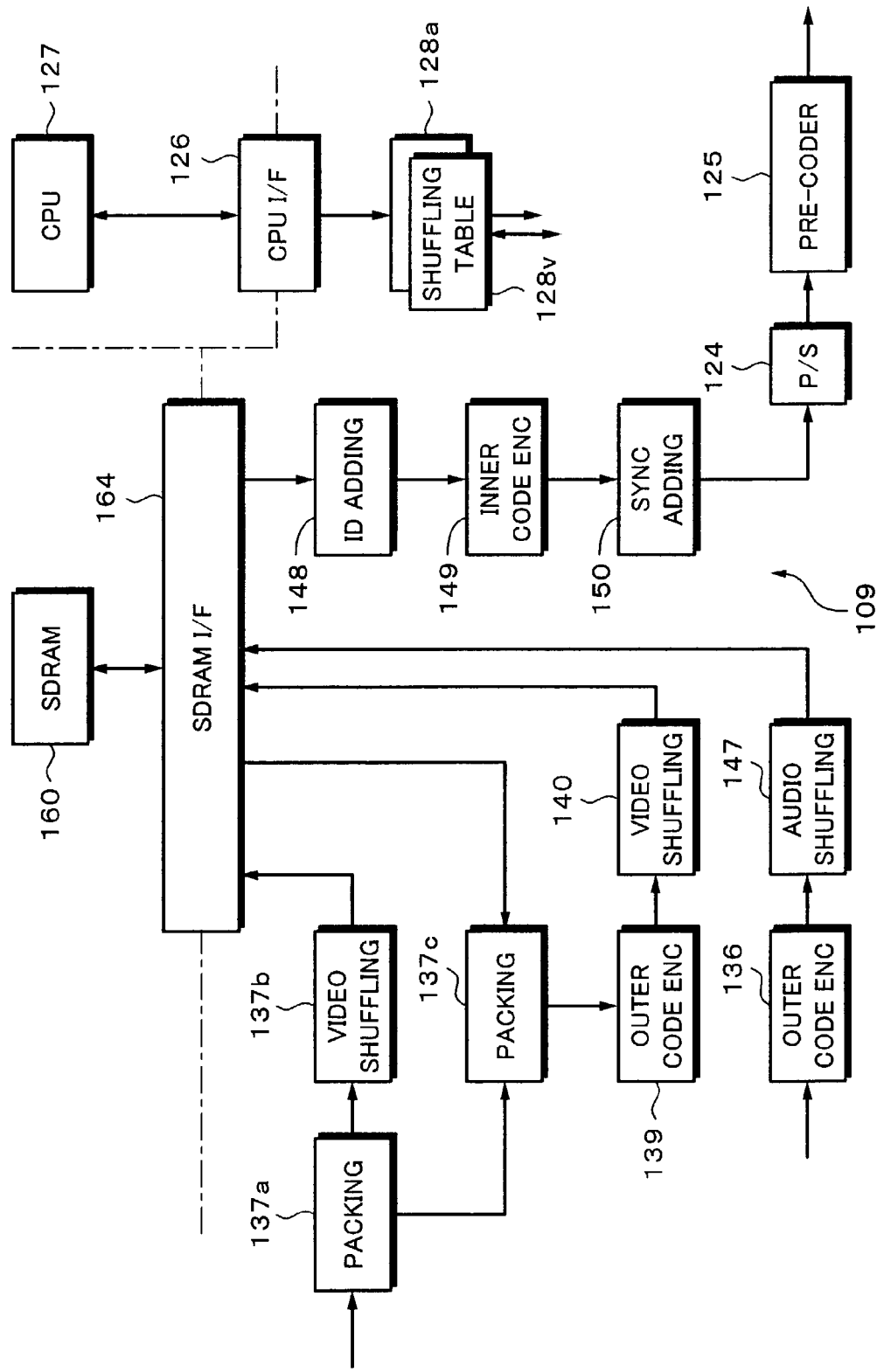
FIG. 23 is a block diagram showing a more practical structure of an ECC encoder.

FIG. 23 shows a more practical structure of the forgoing ECC encoder 109. In FIG. 23, reference numeral 164 is an interface for an external main memory 160 against an IC. The main memory 160 is composed of an SDRAM. The interface 164 arbitrates a request that the ECC encoder 109 issues to the main memory 160 and performs a writing process and a reading process for the main memory 160. A packing portion 137a, a video shuffling portion 137b, and a packing portion 137c compose a packing and shuffling portion 137.

Figure 24:
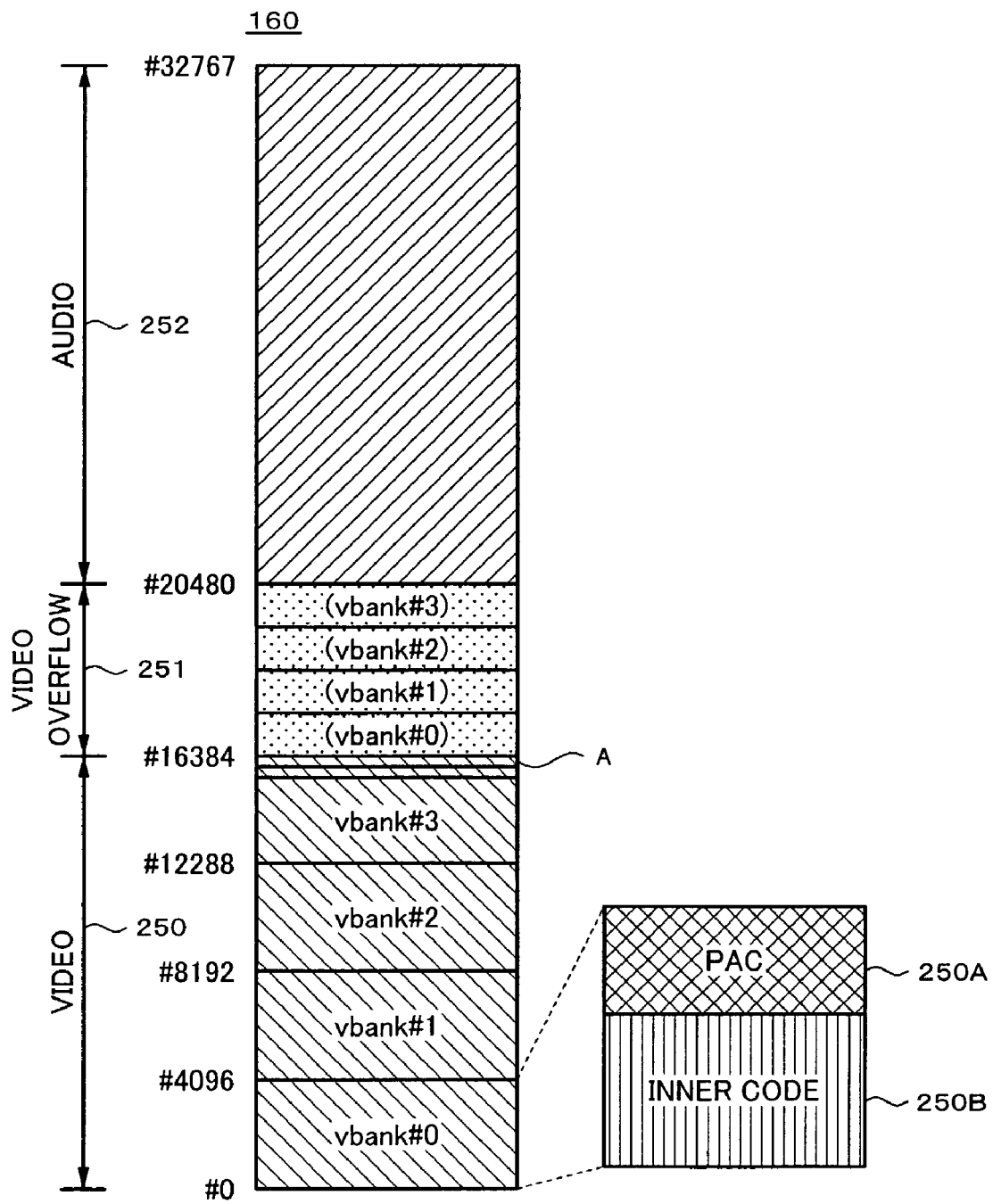
FIG. 24 is a schematic diagram showing an example of an address structure of a main memory.

FIG. 24 shows an example of the address structure of the main memory 160. The main memory 160 is composed of for example an SDRAM of 64 Mbits. The main memory 160 has a video area 250, an overflow area 251, and an audio area 252. The video area 250 is composed of four banks (vbank #0, vbank #1, vbank #2, and vbank #3). Each of the four banks can store a digital video signal for one equal length unit. One equal length unit is a unit of which the amount of data to be generated is controlled to a nearly target value. For example, one equal length unit is one picture of a video signal (I picture). In FIG. 24, portion A represents a data portion of one sync block of a video signal. The number of bytes of data placed in one sync block depends on the format for use. To deal with a plurality of formats, the data size of one sync block is designated a value larger than the maximum number of bytes and that is suitable for the process (for example, 256 bytes).

Each bank of the video area is divided into a packing area 250A and an output area 250B for an inner code encoder. Corresponding to the forgoing video area, the overflow area 251 is composed of four banks. In addition, the main memory 160 has an area 252 in which audio data is processed.

According to the first embodiment of the present invention, with reference to a data length mark of each macro block, the packing portion 137a stores fixed frame length data and overflow data that exceeds the fixed frame length to different areas of the main memory 160. The fixed frame length data is data equal to or smaller than the length of the data area of one sync block. Hereinafter, the fixed frame length data is referred to as block length data. The block length data is stored in a packing process area 250A of each bank. When the data length is smaller than the block length, a blank area takes place in the main memory 160. The video shuffling portion 137b controls write addresses so as to shuffle data. The video shuffling portion 137b shuffles only block length data. The video shuffling portion 137b does not shuffle the overflow portion, but write it to an area assigned thereto.

Next, the packing portion 137c packs and writes the overflow portion to a memory of an outer code encoder 139. In other words, data of the block length is written from the main memory 160 to a memory for one ECC block of the outer code encoder 139. When block length data has a blank area, an overflow portion is written and packed to the blank area. When data for one ECC block is written, the writing process is temporarily stopped. The outer code encoder 139 generates an outer code parity. The outer code parity is stored to the memory of the outer code encoder 139. After the outer code encoder 139 has processed one ECC block, the packing portion 137C rearranges data and an outer code parity supplied from the outer code encoder 139 in the order of an inner code. The resultant data is written to the area 250A in which the packing process is performed and another of the main memory 160. A video shuffling portion 140 controls addresses for which data that has been encoded with an outer code is written to the main memory 160 so as to shuffle each sync block.

Block length data and overflow data are separately written to the first area 250A of the main memory 160 (as a first packing process). Overflow data is packed and written to the memory of the outer code encoder 139 (as a second packing process). An outer code parity is generated. Data and an outer code parity are written to the second area 250B of the main memory 160. Those processes are performed in the unit of one ECC block. Since the outer code encoder 139 has a memory having the size of one ECC block, the access frequency of the main memory 160 can be decreased.

After a predetermined number of ECC blocks (for example, 32 ECC blocks) contained in one picture have been processed, the packing process and outer code encoding process for one picture are completed. Data that is read from the area 250B of the main memory 160 through the interface 164 is processed by an ID adding portion 148, an inner code encoder 149, and a synchronization adding portion 150. A parallel to serial converting portion 124 converts output data of the synchronization adding portion 150 into bit serial data. The output serial data is processed by a partial response class 4 pre-coder 125. When necessary, output data of the partial response class 4 pre-coder 125 is digitally modulated. The resultant data is supplied to the rotating head disposed on the rotating drum 111 through the recording amplifier 110.

A sync block that does not contain valid data (such a sync block is referred to as null sync) is placed in an ECC block so as to allow the structure of an ECC block to have flexibility against the difference of formats of record video signals. A null sync is generated by the packing portion 137a of the packing and shuffling portion 137 and written to the main memory 160.

In the case of audio data, even numbered samples and odd numbered samples of audio data of one field compose different ECC blocks. A sequence of an ECC outer code is composed of audio samples in the input sequence. Whenever an audio sample of an outer code sequence is input, an outer code encoder 136 generates an outer code parity. By controlling addresses at which output data of the outer code encoder 136 is written to the area 252 of the main memory 160, a shuffling portion 147 performs a shuffling process (for each channel and for each sync block).

In addition, a CPU interface 126 is disposed. The CPU interface 126 receives data from an external CPU 127 that functions as a system controller. The CPU interface 126 designates a parameter for an internal block. The CPU interface 126 can designate many parameters such as a sync block length and a parity length so as to deal with a plurality of formats.

A parameter "packing length data" is sent to the packing portions 137a and 137b. The packing portions 137a and 137b pack VLC data to a predetermined fixed frame (having a length represented as "sync block length" in FIG. 22A) corresponding to the parameter "packing length data".

A parameter "number of packs" is sent to the packing portion 137c. The packing portion 137c determines the number of packs per sync block corresponding to the parameter "number of packs" and supplies data corresponding to the determined number of packs to the outer code encoder 139.

A parameter "number of video outer code parities" is sent to the outer code encoder 139. The outer code encoder 139 encodes video data with outer code parities corresponding to the parameter "number of video outer code parities".

A parameter "ID information" and a parameter "DID information" are sent to the ID adding portion 148. The ID adding portion 148 adds the ID information and the DID information to a data sequence of unit length that is read from the main memory 160.

A parameter "number of video inner code parities" and a parameter "number of audio inner code parities" are sent to the inner code encoder 149. The inner code encoder 149 encodes video data and audio data with inner code parities corresponding to the parameter "number of video inner code parities" and the parameter "number of audio inner code parities". A parameter "sync length" is also sent to the inner code encoder 149. The inner code encoder 149 limits the unit length of data encoded with an inner code corresponding to the parameter "sync length".

A parameter "shuffling table" is stored in a video shuffling table (RAM) 128v and an audio shuffling table (RAM) 128a. The shuffling table 128v converts addresses of data shuffled by the video shuffling portions 137b and 140. The shuffling table 128a converts addresses of data shuffled by the audio shuffling portion 137.

Figure 25:
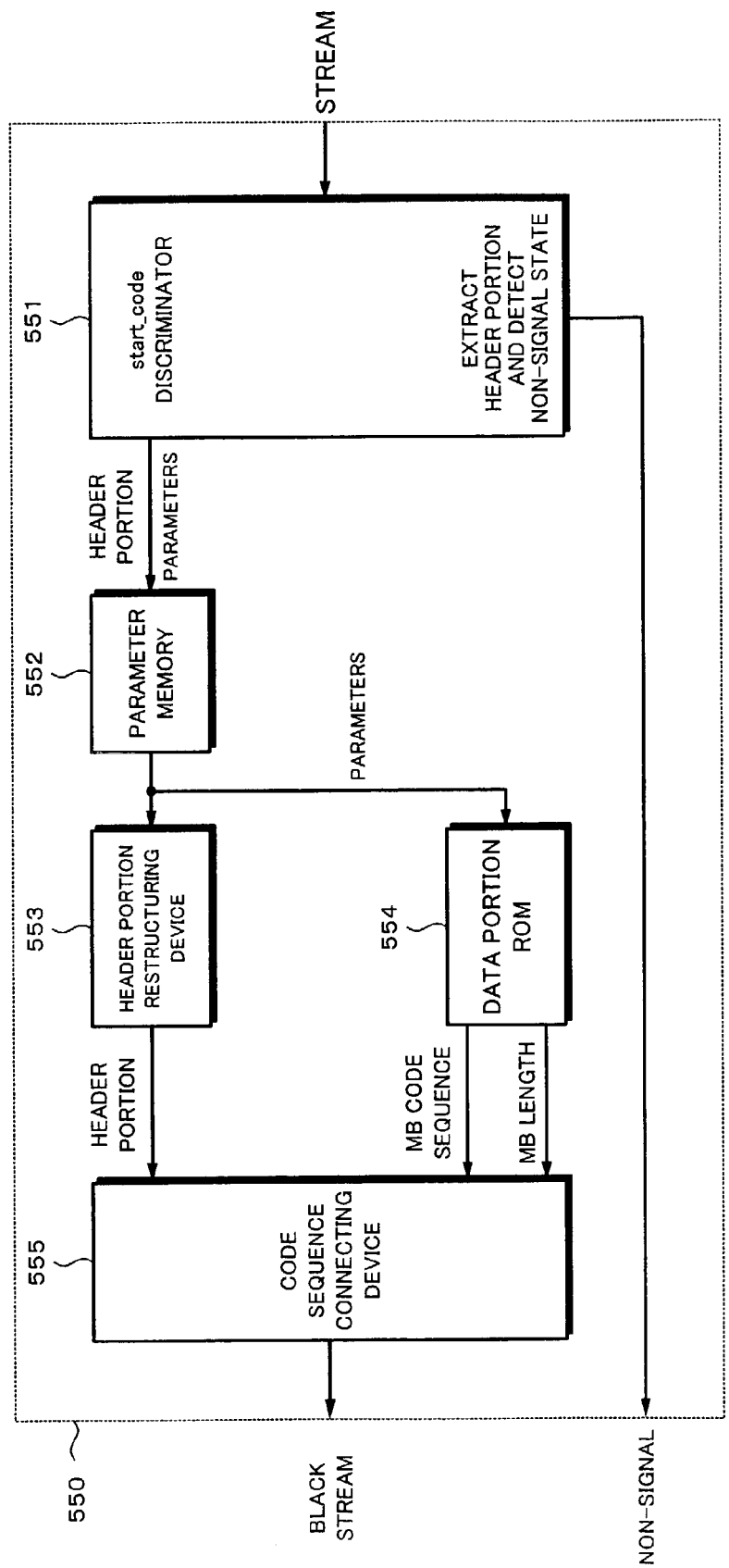
FIG. 25 is a block diagram showing the structure of an example of a black stream generator according to a first embodiment of the present invention.

Next, a stream substituting process according to the present invention will be described in detail. FIG. 25 shows the structure of an example of the forgoing black stream generator 550. In the structure shown in FIG. 25, black streams corresponding to several encoding conditions are pre-stored. From them, a proper black stream is read corresponding to a parameter of an input stream. The original black stream is substituted with the obtained original stream. This structure is referred to as direct type.

A stream that is output from for example the ECC decoder 518 is input to the black stream generator 550 through the switch circuit 532. The stream is supplied to a start code discriminator 551. The stream that is supplied to the start code discriminator 551 is a stream that has been encoded corresponding to the MPEG system. Alternatively, in the structure shown in FIG. 18, the stream that is supplied to the start code discriminator 551 is a converted stream of which a stream that has been encoded corresponding to the MPEG system has been converted. The start code discriminator 551 discriminates a start code of each header contained in the stream so as to extract the header portion and a non-signal state of the stream.

The non-signal state of the stream is detected for example in the following manner. As was described above, as prescribed in the MPEG standard, a picture code 8 that is a four-byte fixed code [00 00 01 00] is added at the beginning of each picture. In addition, a GOP start code 5 that is a four-byte fixed code [00 00 01 B8] is added at the beginning of a GOP. Likewise, a sequence header code 1 that is a four-byte fixed code [00 00 01 B3] is added at the beginning of a sequence. Since the start code (and the sequence code) are fixed codes that are byte-assigned, by matching four-byte patterns, they can be detected without need to decode a variable length code.

In a video apparatus, an output signal is output in synchronization with a frame and/or field synchronous signal that is input from the outside of the apparatus, with a video signal that is input from the outside of the apparatus, or with a frame and/or field synchronous signal that is generated in the apparatus. In other words, any frame and/or field synchronous signal is always present in the apparatus. Thus, the start code discriminator 551 monitors the frame and/or field synchronous signal of the input frame and the picture start code 8 so as to determine whether or not the picture start code 8 is present in a predetermined time period. As a result, the start code discriminator 551 can detect the non-signal state of the input stream.

The detected result of which the non-signal state has been detected is output as a control signal of the switch circuit 534.

On the other hand, parameters of the header portion extracted by the start code discriminator 551 are supplied to a parameter memory 552. The parameter monitor 552 stores the supplied parameters of the header portion. For example, the sequence header 2, the sequence extension 3, the GOP header 6, the picture header 9, the picture encoding extension 10, and other extensions are separately extracted from the header portion discriminated by the start code discriminator 551 and stored in the parameter memory 552.

The parameters stored in the parameter memory 552 are supplied to a data portion ROM 554. The data portion ROM 554 pre-stores streams of slice headers 13 and macro blocks corresponding to various parameters. They compose the forgoing black streams. A proper slice header 13 and a proper macro block are read from the data portion ROM 554 corresponding to the parameters that are output from the parameter memory 552. Corresponding to the data that has been read, a macro block encoded sequence and a macro block length are output.

The parameters stored in the parameter memory 552 are also supplied to a header portion restructuring device 553. The header portion restructuring device 553 restructures a header portion corresponding to the supplied parameters.

The header portion restructured by the header portion restructuring device 553 and the macro block encoded sequence and the macro block length that are output from the data portion ROM 554 are supplied to a code sequence connecting device 555. The code sequence connecting device 555 connects macro block encoded sequences corresponding to for example the macro block length. In addition, the code sequence connecting device 555 connects a header portion to a macro block encoded sequence. As a result, the code sequence connecting device 555 forms an MPEG ES of a black stream. The black stream is output from the code sequence connecting device 555 and supplied to the other input terminal of the switch circuit 534.

In the forgoing structure, when the start code discriminator 551 has detected the non-signal state of the input stream, the start code discriminator 551 causes the switch circuit 534 to be switched from one input terminal to the other input terminal. In addition, parameters stored in the parameter memory 552 are read and supplied to the data portion ROM 554 and the header portion restructuring device 553. At that point, the start code discriminator 551 stops supplying the parameters of the header portion to the parameter memory 552. As a result, the parameter memory 552 stores the parameters of the header portion of the stream in the state immediately before the non-signal state of the stream is detected.

Corresponding to the parameters that are read from the parameter memory 552, the header portion restructuring device 553 restructures the header portion. The slice header 13 and the macro blocks are read from the data portion ROM 554 corresponding to the parameters. The code sequence connecting device 555 gaplessly packs the header 13 and the macro blocks and forms a black stream. The formed black stream is output from the black stream generator 550 and supplied to the other input terminal of the switch circuit 534. The black stream is supplied to the MPEG decoder 520 and obtained from the output terminal 519.

The start code discriminator 551 always monitors a stream to be output. The generated black stream is placed in the stream downstream the monitored position. Thus, when the state of the signal to be output is changed from the non-signal state to a significant signal state, the start code discriminator 551 detects that a significant stream is flowing. Corresponding to the detected result, the switch circuit 534 is controlled so as to stop outputting the black stream.

Next, the header portion of the black stream structured by the header portion restructuring device 553 will be described in detail. When the start code discriminator 551 has detected the non-signal state of the stream and the switch circuit 534 has switched the stream to the black stream corresponding to the detected result, with the parameters extracted from the stream and stored in the parameter memory 552 in the state immediately before the stream is changed to the black stream, the header portion of the black stream is structured.

When the stream that has not been changed to the black stream is completed with the sequence end code, the header portion restructuring device 553 should structure the header portion of the black stream with the sequence header 1. At that point, the sequence header 1, the sequence extension 3, the picture header 9, and the picture encoding extension 10 are used as necessary and satisfactory conditions. Thus, the GOP header 6 is not always necessary. These headers are read from the parameter memory 552 and supplied to the header portion restructuring device 553. The contents of the sequence header 1 and the sequence extension 3 can be freely designated, not restricted by the parameters stored in the parameter memory 552.

In contrast, immediately before a stream is changed to a black stream, when the stream is not completed with a sequence end code, it is sufficient to create only an area after the picture header 9. The picture header 9 and the picture encoding extension 10 are used as necessary and sufficient conditions. In other words, the sequence header 1, the sequence extension 3, and the GOP header 6 are not always required.

Immediately before a stream is changed to a black stream, when the stream is not completed with a sequence end code, it is possible to add the sequence header 1, the sequence extension 3, and the GOP header 6. In this case, the contents of the sequence header 1 and the sequence extension 3 should be the same as the contents of the parameters extracted from the stream in the state immediately before the stream is changed.

Immediately before a stream is changed, regardless of whether or not the stream is completed with a sequence end code, user data is not required, but omissible.

picture_coding_type of the picture header 1 is changed to value 1 that represents an I picture. As a result, there is a case that the value of f_code of the picture encoding extension 10 should be rewritten to 15.

In the picture header 9 and the picture encoding extension 10, principally, it is not necessary to change parameters other than the forgoing picture_coding_type and f_code. When the parameters intra_dc_precision, frame_pred_frame_dct, and intra_vlc_format of the picture encoding extension 10 are written as intra_dc_precision=0, frame_pred_frame_dct=1, and intra_vlc_format=0, respectively, the macro block layer can be easily generated.

Next, picture data generated by the data portion ROM 554 and the code sequence connecting device 555 will be described in detail. When one stripe is composed of one slice, picture data can be easily generated. In other words, when one stripe is composed of one slice, macroblock_address_increment that is a parameter that represents an increment of the horizontal direction of a macro block can be always fixed to value "1" regardless of the macro block address. As a result, the code amount can be minimized.

On the other hand, when a stream is output to a VCR, due to an input restriction thereof, there is a case that one stripe should be divided into several slices. For example, in the VCR according to the first embodiment of the present invention, one slice is composed of one macro block and a stripe is divided into several slices. In this case, each macro block is encoded with macroblock_address_increment corresponding to the horizontal position of a slice. The number of slices and the number of macro blocks in one slice are determined with horizontal_size and vertical_size that are parameters of the sequence header 1 and that represent the screen size.

Header portions and picture data of a black stream and a gray stream generated in the forgoing manner are defined as follows. In the following, for simplicity, conditions picture_coding_type=I (I picture) and one slice=1 stripe are given.

First of all, a black stream in the case that the color difference format is 4:2:0 will be described. FIG. 26 shows changed portions of an example of the picture header 9. The value of the parameter picture_coding_type is changed to "001" that designates an I picture. The value of the parameter intra_de_precision is changed to "00" that designates eight bits for the accuracy of a DC coefficient. The value of the parameter picture_structure is changed to "11" that designates a frame structure. The value of the parameter frame_pred_frame_dct is changed to "1" that designates a frame prediction and a frame DCT flag. The value of the parameter intra_vlc_format is changed to "0" that designates an intra macro block VLC type. These parameters are changed by the header portion restructuring device 553.

FIG. 27A shows an example of an algorithm for generating picture data. Picture data is composed of a slice header 13 and a macro block encoded sequence. The code sequence connecting device 555 generates picture data corresponding to the algorithm shown in FIG. 27A. At that point, SLICE_HEADER, MACROBLOCK_1, and MACROBLOCK_2 shown in FIG. 27B are used in the algorithm and embedded in picture data that is generated. The algorithm shown in FIG. 27A and other algorithms shown in FIGS. 30A, 33A, and 36A are described in C language, which is a programming language.

As was described above, SLICE_HEADER, MACROBLOCK_1, and MACROBLOCK_2 are pre-stored in the data portion ROM 554. FIGS. 28A, 28B, and 28C show examples of SLICE_HEADER, MACROBLOCK_1, and MACROBLOCK_2, respectively, in detail.

SLICE_HEADER corresponds to the slice header 13. The slice header 13 is composed of a slice start code 12 and vertical position information of a slice. FIG. 28A shows an example of data that composes the slice header 13. In FIG. 28A, "********" represents vertical position information of a slice. For a parameter quantizer_scale_code, any five-bit value other than "00000" can be used. In the example, "00001" is used.

Next, macro blocks will be described. FIGS. 28B and 28C examples of data that composes macro blocks. A black stream contains only a DC component as a quantized DCT coefficient. Thus, other quantized DCT coefficients are all 0. Thus, for an inversely quantizing parameter, any value can be used. In the example, the slice structure of a picture matches a stripe. As a result, a parameter macroblock_address_increment is simplified.

The value of a parameter macroblock_type is designated "Intra". "quant" is not required. The value of a parameter dct_type depends on other parameters. Even if there is a parameter dct_type, it can be designated any value. This is because regardless of whether a black stream is decoded as a frame DCT or a field DCT, the reproduced screen is black. This applies to a gray stream. As was described above, when the value of the parameter frame_pred_frame_dct is changed to 1 by the picture header portion 9, the parameter dct_type can be always omitted. As a result, the structure of the black stream generator 550 can be simplified. A parameter quantizer_scale_code of the macro block layer is omitted.

A coefficient of a DC coefficient of the first macro block of a slice is processed in a different manner from that of each of the second and later macro blocks of the slice. First of all, the process for the first macro block (at the left end of the screen) of the slice will be described with reference to FIG. 28B. In this case, a DC coefficient of an I picture is not quantized. In the first macro block of the slice, an increment against the middle value is encoded. When the accuracy of pixel data is eight bits (in the case that the value of the parameter intra_dc_precision is "00"), pixel values that cause a black screen to be displayed are Y=16 and Cb=Cr=128. Thus, as a DC coefficient of the first luminance signal block of the slice, 16−128=−112 is encoded. As a DC coefficient of the first color difference signal block of the slice, 128−128=0 is encoded.

When the accuracy of the DC coefficient is nine bits (intra_dc_precision=01), as the DC coefficient of the first luminance signal block of the slice, 32−256=−224 is encoded. As the DC coefficient of the first color difference signal block of the slice, 256−256=0 is encoded. When the accuracy of the DC coefficient is 10 bits (intra_dc_precision=10), as the DC coefficient of the first luminance signal block of the slice, 64−512=−448 is decoded. As the DC coefficient of the first color difference signal block of the slice, 512−512=0 is encoded. When the accuracy of the DC coefficient is 11 bits (intra_dc_precision=11), as the DC coefficient of the first luminance signal block of the slice, 128−1024=−896 is encoded. As the DC coefficient of the first color difference signal block of the slice, 1024−1024=0 is encoded.

In such a manner, the accuracy of the DC coefficient is defined corresponding to the value of the parameter intra_dc_precision of the picture header 9. Corresponding to the accuracy of the DC coefficient, the value that is encoded is varied. When the value of the variable intra_dc_precision of the picture header 9 can be rewritten to a fixed value, the number of black streams that can be selected can be decreased.

Next, the process for the second or later macro block (other than the left end of the screen) of the slice will be described with reference to FIG. 28C. For the second or later macro block of the slice and the DC coefficient thereof, an increment against the DC coefficient of the preceding macro block thereof is encoded. Thus, in the example of which all one screen is displayed in black, since there is no change against the immediately preceding macro block, all 0s are encoded.

To cause the values of all quantized DCT coefficients other than the DC coefficient to be 0, EOB (End Of Block) that represents data at the end of the block is placed after each DC coefficient.

Next, a black stream in the case that the color difference format is 4:2:2 will be described. This case is almost similar to the forgoing case that the color difference format is 4:2:0. FIG. 29 shows changed portions of an example of the picture header 9. This case corresponds to the forgoing case that the color difference format is 4:2:0. FIG. 30A shows an example of an algorithm for generating picture data. The code sequence connecting device 555 generates picture data corresponding to the algorithm shown in FIG. 30A. At that point, SLICE_HEADER, MACROBLOCK_1, and MACROBLOCK_2 are used in the algorithm and embedded in picture data that is generated.

FIGS. 31A, 31B, and 31C show examples of SLICE_HEADER, MACROBLOCK_1, and MACROBLOCK_2, respectively, in detail. MACROBLOCK_1 and MACROBLOCK_2 represent a macro block at the left end of the screen and a macro block not at the left end of the screen, respectively. As with the forgoing case that the color difference format is 4:2:0, in the case that the color difference format is 4:2:2, for a macro block at the left end of the screen, a DC coefficient is not quantized, but an increment against the middle value is encoded. For a macro block not at the left end of the screen, an increment corresponding to a DC coefficient of the immediately preceding macro block thereof is encoded. In the case that the color difference format is 4:2:2, DCT blocks $Cb_2$ and $Cr_2$ that are not present in the forgoing case that the color difference format is 4:2:0 are added. As was described above, SLICE_HEADER, MACROBLOCK_1, and MACROBLOCK_2 are pre-stored in the data portion ROM 554.

Next, a gray stream in the case that the color difference format is 4:2:0 will be described. In the case of a gray screen, all a luminance signal and color difference signals have a middle value (128). Thus, according to the forgoing calculating method, as a DC coefficient of the first luminance signal block of the slice and a DC coefficient of the first color difference signal block of the slice, 128−128=0 is encoded. As a DC coefficients of the second or later luminance signal (of the second or later macro block) of the slice and a DC coefficient of the second or later color difference signal (of the second or later macro block) of the slice, an increment against the DC coefficient of the immediately preceding luminance signal block thereof and an increment against the DC coefficient of the immediately preceding color difference signal block thereof is encoded, respectively. Thus, as the DC coefficients of the luminance signal block and the color difference signal block, 0 is encoded. As a result, a gray stream is a pattern of which the amount of code generated is the minimum in the MPEG system.

FIG. 32 shows changed portions of an example of the picture header 9. Parameters of the picture header 9 are changed in the same manner as those shown in FIG. 26. FIG. 33A shows an example of an algorithm for generating picture data. In the same manner as the forgoing case, the code sequence connecting device 555 generates picture data corresponding to the algorithm shown in FIG. 33A. At that point, SLICE_HEADER and MACROBLOCK are used in the algorithm and embedded in picture data that is generated.

FIGS. 34A and 34B show examples of SLICE_HEADER and MACROBLOCK, respectively, in detail. As was described above, SLICE_HEADER and MACROBLOCK are pre-stored in the data portion ROM 554.

This applies to a gray stream in the case that the color difference format is 4:2:2. FIG. 35 shows changed portions of an example of the picture header 9. Parameters of the picture header 9 are changed as shown in FIG. 26. FIG. 36A shows an example of an algorithm for generating picture data. In the same manner as the forgoing case, the code sequence connecting device 555 generates picture data corresponding to the algorithm shown in FIG. 36A. At that point, SLICE_HEADER and MACROBLOCK shown in FIG. 36B are used in the algorithm and embedded in picture data that is generated.

FIGS. 37A and 37B show examples of SLICE_HEADER and MACROBLOCK, respectively, in detail. As was described above, SLICE_HEADER and MACROBLOCK are pre-stored in the data portion ROM 554.

Next, an interpolation for a stream using a black stream or a gray stream will be described. In the following description, it is assumed that a non-signal period of a stream is interpolated with a black stream. FIGS. 38A, 38B, 38C, and 38D show an interpolation for a stream using a black stream. In the stream, for example the picture header 9 is synchronized with a frame synchronous signal shown in FIG. 38A. It is assumed that the stream has a period for a non-signal state as shown in FIG. 38B. When the start code discriminator 551 detects the non-signal state, a black stream as exemplified in FIG. 38C is generated. The header is synchronized with the frame synchronous signal. As a result, the non-signal period for the original stream is substituted with the black stream. Consequently, as shown in FIG. 38D, a stream of which the non-signal period is interpolated with the black stream is obtained.

There are two methods for substituting an original stream with a black stream. In the first method, a stream is output until the end of a significant picture. A sequence end code is added at the end of the significant picture. The picture is substituted with a black stream to which the sequence header code 1 has been added.

Figure 39A:
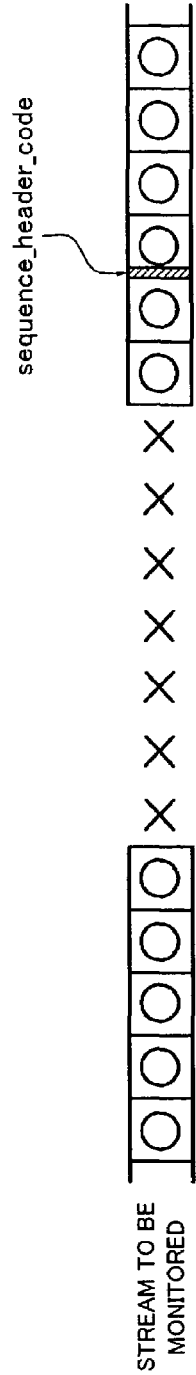
FIGS. 39A and 39B are schematic diagrams showing an outline of a first method for changing a particular stream to a black stream.
Figure 39B:
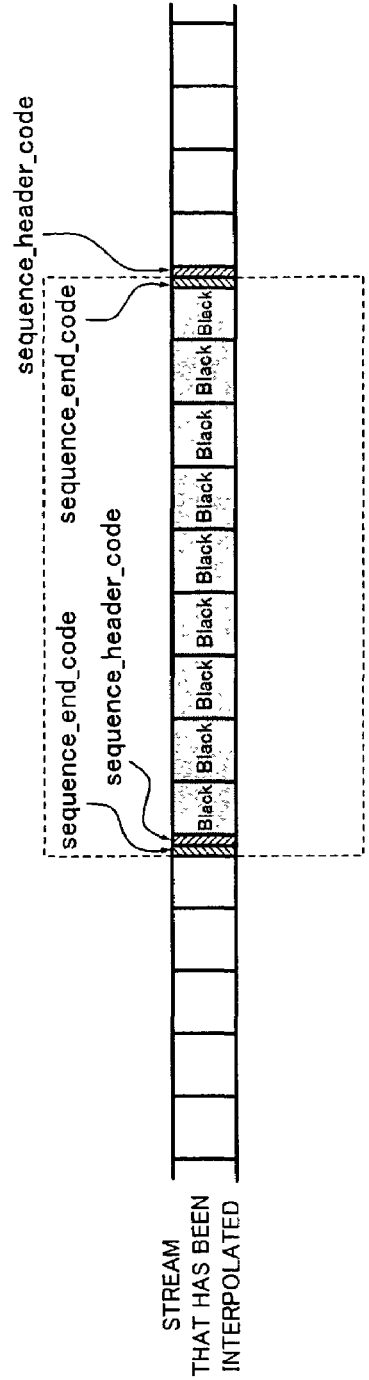

FIGS. 39A and 39B show an outline of the first method. In FIGS. 39A, 39B, 40A, and 40B, a stream is delimited in each stream (namely, each picture). In a stream shown in FIG. 39A, a region denoted by "X" is a period in a non-signal state. In the example, after two pictures preceded by the non-signal state, the next sequence header code is present. As exemplified in FIG. 39B, a sequence header is added at the end of a significant picture. Immediately after the sequence header, a predetermined sequence header is placed. The predetermined sequence header is followed by a black stream.

In the second method, a stream is output until the end of a significant picture. In this case, a sequence end code is not added to the stream. The stream is substituted with a black stream having the same encoding conditions (parameters) as the immediately preceding stream. FIGS. 40A and 40B show an outline of the second method. As exemplified in FIG. 40B, a black stream is placed after a significant picture shown in FIG. 40A. Encoding parameters of the black stream that is placed after the significant picture are the same as those of the immediately preceding sequence thereof. With headers stored in the parameter memory 552, a header portion of the black stream to be placed is structured.

When a significant stream is detected after a non-signal state has been detected, a black stream is suppressed from being generated and output. At that point, as shown in FIGS. 39B and 40B, the black stream is restored to the regular stream in the following manner. First of all, a sequence end code is added to the black stream. As a result, the black stream is completed. From the beginning of the next sequence (namely, the next sequence header code), the regular stream is restarted. At that point, significant pictures after the non-signal state is restored to the regular stream until the next sequence header is detected are discarded. In the examples shown in FIGS. 39A and 40A, data of two pictures before the position of the sequence header is discarded.

There is a case that a regular stream in a period of a non-signal state contains a sequence end code that designates encoding parameters that are different from those of the immediately preceding stream. In this case, when significant pictures after the non-signal state is restored to the regular stream until the next sequence header code is detected are reproduced using end code parameters contained in the sequence header of the stream immediately before the non-signal state is restored to the regular stream, the pictures that are displayed may be different from pictures that are intended. In the first method, since a black stream with which the non-signal state is interpolated completes one sequence, such a situation can be prevented.

In the forgoing example, only one method for restoring a black stream to a regular stream was described. However, the present invention is not limited to such a method. For example, in a particular video apparatus, parameters of a sequence header are limited to one set. In this case, it is clear that the parameters of the sequence header are not changed. In such a case, the following process can be performed.

In other words, when a regular stream is substituted with a black stream, the regular stream is output until the end of a significant picture. In this case, a sequence end code is not added at the end of the significant picture. The regular stream is substituted with a black stream having the same encoding conditions as the regular stream. When the black stream is restored to the regular stream, the black stream is completed. In this case, a sequence end code is not added at the end of the black stream. The black stream is restored to a significant picture.

In the stream to which the black stream is restored, unless the value of the parameter closed_gop is 1 in the GOP header, the value of the parameter broken_link should be changed to "1" so that immediately after the black stream is restored to the regular stream, B pictures are prevented from getting disordered. In this case, when the regular stream is decoded, a group of B pictures placed at the beginning of the GOP is lost. When the value of the parameter closed_gop is 1, it is not necessary to change the value of the parameter broken_link.

Second Embodiment

Next, a second embodiment of the present invention will be described. According to the second embodiment of the present invention, a signal generator generates a base band signal that causes a black screen to be displayed (hereinafter, this base band signal is referred to as base band black signal). This base band black signal is encoded. As a result, a black stream is obtained. The method used in the first embodiment is referred to as direct type, whereas the method used in the second embodiment is referred to as indirect type.

Figure 41:
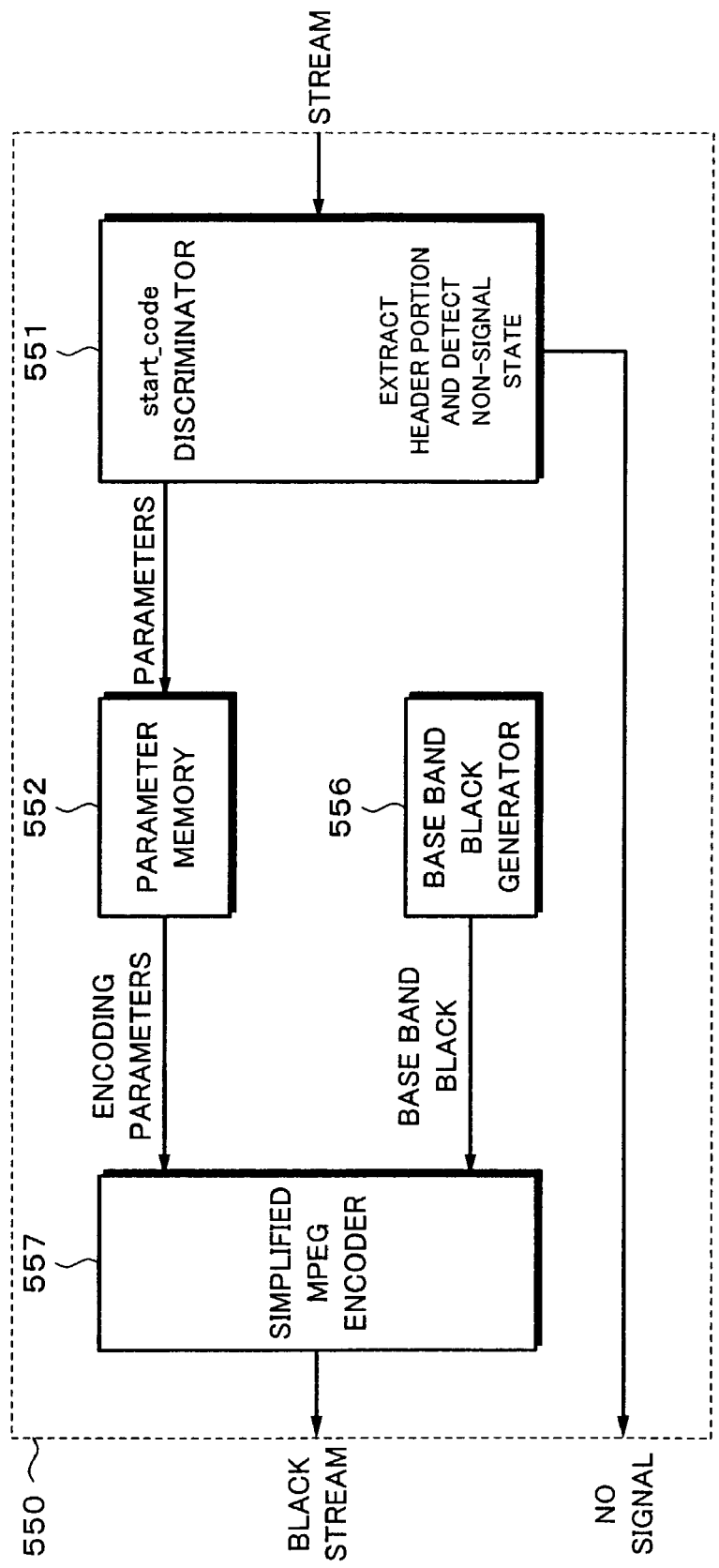
FIG. 41 is a block diagram showing the structure of an example of a black stream generator according to a second embodiment of the present invention.

FIG. 41 shows the structure of an example of a black stream generator 550 according to the second embodiment of the present invention. In FIG. 41, for simplicity, similar portions to those in FIG. 25 will be denoted by similar reference numerals and their description will be omitted. The operation of the black stream generator 550 shown in FIG. 41 is the same as that of the structure shown in FIG. 3.

The structure of the direct type shown in FIG. 25 has the data portion ROM 554 that pre-stores parameters for a black stream and/or a gray stream. In contrast, the structure of the indirect type shown in FIG. 41 has a base band black generator 556 and a simplified MPEG encoder 557.

A stream is input to the black stream generator 550. The stream is supplied to a start code discriminator 551. The start code discriminator 551 extracts each header portion from the stream. Parameters are extracted from each header portion. The extracted parameters are supplied to a parameter memory 552. In addition, the start code discriminator 551 detects a non-signal state of the input stream. When the start code discriminator 551 has detected the non-signal state, the parameters in the state immediately before the non-signal state is detected are stored in the parameter memory 552. The parameters stored in the parameter memory 552 are similar to those stored in the structure according to the first embodiment. When the start code discriminator 551 has detected the non-signal state, the start code discriminator 551 outputs a control signal. The control signal causes a switch circuit 534 to select an input terminal that is different from an input terminal to which the black stream generated by the black stream generator 550 is output.

When the start code discriminator 551 has detected the non-signal state, the base band black generator 556 generates for example a base band black signal. The base band black signal is supplied to the simplified MPEG encoder 557. The simplified MPEG encoder 557 encodes the base band black signal supplied from the base band black generator 556 in encoding condition corresponding to parameters of each header portion stored in the parameter memory 552.

The black stream of which the base band black signal has been encoded by the simplified MPEG encoder 557 is supplied to the other input terminal of the switch circuit 534. The black stream is supplied to a downstream circuit through the switch circuit 534.

The simplified MPEG encoder 557 need have only a performance for encoding for example a base band black signal to a black stream. In other words, the simplified MPEG encoder 557 need encode only a limited encoding performance for only intra macro blocks or DC coefficients and EOB regardless of the values of the parameters dct_type and quantizer_scale_code. Thus, the simplified MPEG encoder 557 can be structured with a relatively small circuit scale.

As with the first embodiment, the start code discriminator 551 always monitors a stream to be output. A generated black stream is placed after the monitored position of the stream. Thus, when the non-signal state of a signal to be output is restored to a significant stream, the start code discriminator 551 detects that the significant stream is flowing. Corresponding to the detected result, the switch circuit 534 is controlled so as to stop outputting the black stream.

Third Embodiment

Figure 42:
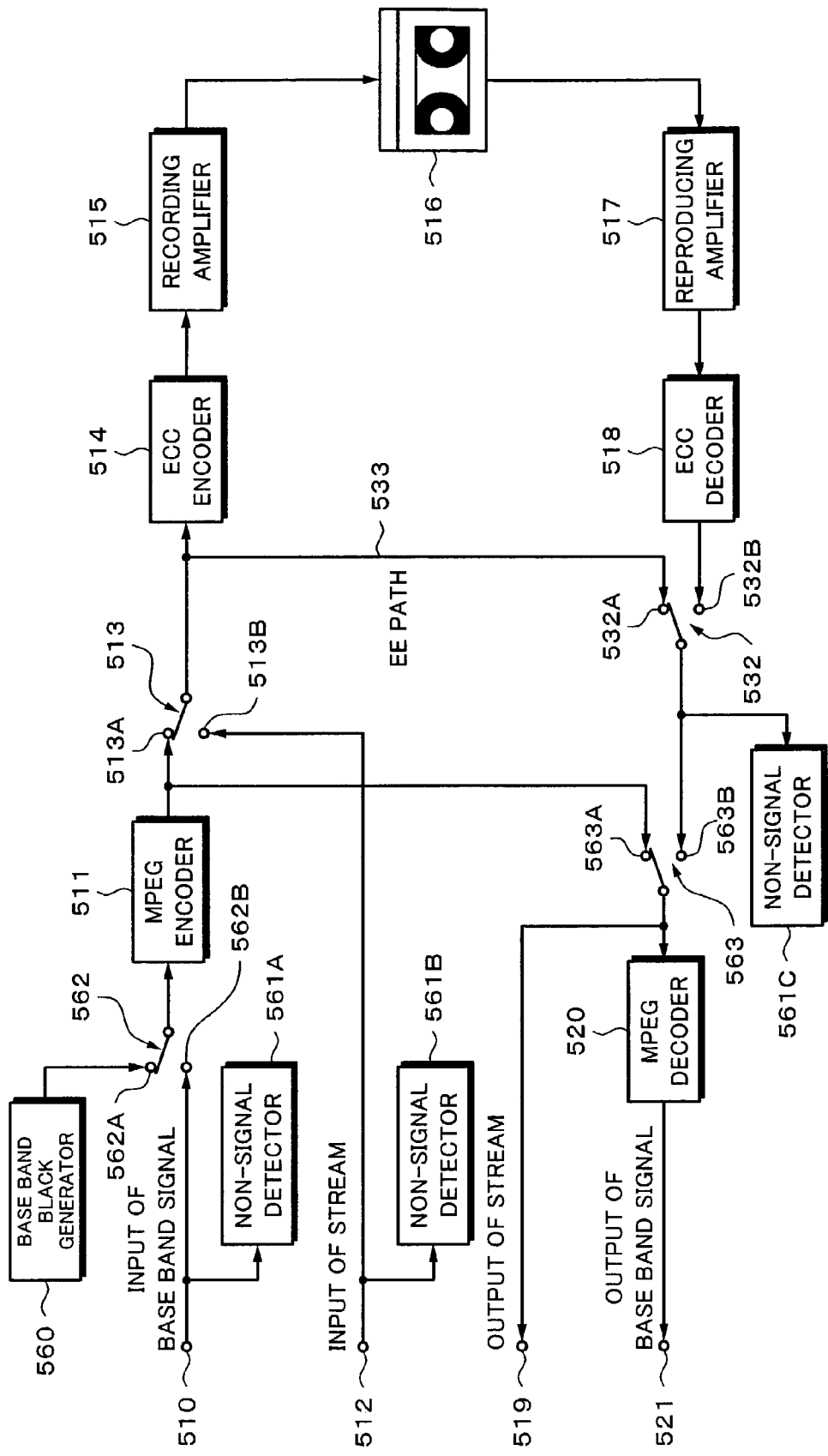
FIG. 42 is a block diagram showing an example of a fundamental structure of a VCR according to a third embodiment of the present invention.

Next, a third embodiment of the present invention will be described. FIG. 42 shows an example of the fundamental structure of a VCR according to the third embodiment of the present invention. In FIG. 42, for simplicity, similar portions to those in FIG. 3 will be noted by similar reference numerals and their description will be omitted. According to the third embodiment, a black stream is generated corresponding to the indirect type according to the second embodiment of the present invention. In addition, a non-signal state is monitored for not only a reproduced stream, but an input signal.

A base band signal is input from a terminal 510. The base band signal is supplied to a non-signal detector 561A. The non-signal detector 561A detects a non-signal state of the base band signal. The base band signal is also input to a terminal 562B of a switch circuit 562. An output signal of a base band black generator 560 is supplied to a terminal 562A of the switch circuit 562. The signal that is output from the base band black generator 560 causes a base band black signal to be generated. The signal generated by the base band black generator 560 is not limited to the base band black signal that causes a black screen to be displayed. Instead, the signal generated by the base band black generator 560 may be the forgoing base band gray signal that causes a gray screen to be displayed. An output signal of the switch circuit 562 is supplied to an MPEG encoder 511.

An output signal of the MPEG encoder 511 is input to a terminal 513A of a switch circuit 513. In addition, the output signal of the MPEG encoder 511 is input to a terminal 563A of a switch circuit 563 on the reproducing side.

A stream is input from a terminal 512. The stream is supplied to a non-signal detector 561B. The non-signal detector 561B detects a non-signal state of the stream. In addition, the stream is input to a terminal 513B of the switch circuit 513. The non-signal detector 561B detects a non-signal state of the stream in the same manner as for example the forgoing start code discriminator 551.

An output signal of the switch circuit 513 is supplied to an ECC encoder 514 and input to a terminal 532A of a switch circuit 532 through an EE path 533. An output signal of an ECC decoder 518 is input to a terminal 532B of the switch circuit 532. An output signal of the switch circuit 532 is input to a terminal 563B of the switch circuit 563 and supplied to a non-signal detector 561C. The non-signal detector 561C detects the non-signal state of the stream in the same manner as the forgoing start code discriminator 551.

An output signal of the switch circuit 563 is obtained from a terminal 519 to which the stream is output. In addition, the output signal of the switch circuit 563 is supplied to an MPEG decoder 520. The MPEG decoder 520 decodes the signal that is output from the switch circuit 563 to a base band signal. The base band signal is obtained from a terminal 512.

The switch circuit 562 is controlled corresponding to the detected result of the non-signal state by the non-signal detector 561A, 561B, or 561C. For example, the terminal 526B of the switch circuit 562 is normally selected. When the non-signal detector 561A, 561B, or 561C has detected the non-signal state, the terminal 562B of the switch circuit 562 is switched to the terminal 562A. The switch circuit 563 is controlled corresponding to the detected result of the non-signal state by the non-signal detector 561C. For example, the terminal 563*b* is normally selected. When the non-signal detector 561C has detected the non-signal state, the terminal 563*b* of the switch circuit 563 is switched to the terminal 563A. In addition, the switch circuit 513 switches the input of the terminal 513A to the input of the terminal 513B or vice versa. Corresponding to the detected result of the non-signal detector 561B, the switch circuit 513 is switched from the terminal 513A to the terminal 513B or vice versa.

In such a structure, when the non-signal detector 561A has detected the non-signal state of the base band signal that has been input from the terminal 510, the terminal 562B of the switch circuit 562 is switched to the terminal 562A. The base band black signal generated by the base band black generator 560 is supplied to the MPEG encoder 511 through the switch circuit 562. The MPEG encoder 511 encodes the base band black signal and outputs the encoded signal as a black stream.

When the non-signal detector 561B has detected the non-signal state of the stream that has been input from the terminal 512, the switch circuit 562 is switched to the terminal 562A. In addition, the switch circuit 513 is switched to the terminal 513A. The base band black signal generated by the base band black generator 560 is supplied to the MPEG encoder 511 through the switch circuit 562. The MPEG encoder 511 encodes the base band black signal and outputs the encoded signal as a black stream. Since the switch circuit 513 has been switched to the terminal 513A, the stream that has been input from the terminal 512 is shut off by the switch circuit 513. The black stream that is output from the MPEG encoder 511 is supplied to the ECC encoder 514 through the switch circuit 513.

When the stream supplied from the EE path 533 or the non-signal state of the stream reproduced from a magnetic tape 516 and output from an ECC decoder 518 through a reproducing amplifier 517 is detected by the non-signal detector 561C, the switch circuit 563 is switched to the terminal 563A. In addition, the switch circuit 562 is switched to the terminal 562A. In addition, when the switch circuit 513 has been switched to the terminal 513B, the switch circuit 513 is switched to the terminal 513A. The stream that has been output from the ECC decoder 518 is shut off by the switch circuit 563.

On the other hand, the base band black signal that is output from the base band black generator 560 is supplied to the MPEG encoder 511 through the switch circuit 562. The MPEG encoder 511 encodes the base band black signal and outputs the encoded signal as a black stream. The black stream that is output from the MPEG encoder 511 is supplied to the MPEG decoder 520 through the switch circuit 563. In addition, the black stream is obtained from the terminal 519 to which the stream is output. The MPEG decoder 520 decodes the black stream and outputs the decoded signal as a base band black signal. The base band black signal is obtained from the terminal 521.

Since the black stream placed when the non-signal state is detected on the reproducing side should be supplied downstream of the non-signal detector 561C on the reproducing side, the black stream is placed as shown in FIG. 42.

The first and second methods described with reference to FIGS. 39 and 30 apply to the switching method and restoring method for the switch circuits 562, 513, and 563.

According to the third embodiment of the present invention, the base band black generator 560 need have a performance for generating only a simple base band black signal. In addition, since a black stream is generated using the MPEG encoder 511 on the recording side, it is not necessary to provide an encoder that encodes the black stream. Likewise, it is not necessary to decode the header portion of a stream and store parameters. In addition, it is not necessary to store a black stream.

Many professional VCRs or many VCRs used in broadcasting stations have a signal generator on the recording side. The signal generator generates signals including a base band black signal. The signal generator also generates a signal that causes for example a color bar to be displayed. According to the third embodiment of the present invention, the signal generator can be used as the base band black generator 560.

In addition, according to the third embodiment of the present invention, non-signal states of a base band input and a stream input are detected. Corresponding to the detected results, a period for a non-signal state is substituted with a black stream. Thus, a record signal recorded on the magnetic tape 516 can be interpolated with the black stream. In other words, when a non-signal state is detected while a signal is being recorded, a base band black signal generated by the base band black generator 560 is encoded by the MPEG encoder 511. The encoded base band black signal is recorded as a black stream to the magnetic tape 516 through the ECC encoder 514 and the recording amplifier 515. Thus, even if there is a period for a non-signal state in an input stream or an input base band signal, an abnormal record region can be prevented from being formed on the magnetic tape 516.

If an abnormal stream such as a non-signal state has been recorded on a tape, when the tape is reproduced, there is a possibility of which reproducing apparatus malfunctions or hangs up. However, when the third embodiment of the present invention is applied to a recording apparatus, such a situation can be prevented in advance.

The non-signal detector and the base band black generator 560 are not limited to the forgoing structure. In other words, the non-signal detector and the base band black generator 560 can be separately disposed. In addition, according to the first embodiment and the second embodiment, the header portion extractor and the non-signal state detector can be separately disposed.

In addition, according to the first embodiment and the second embodiments, the header portion extractor and the parameter memory 552 contained in the start code discriminator 551 can be shared with the MPEG decoder 520. In this case, the black stream generator 550 receives parameters of the stream from the MPEG decoder 520.

Alternatively, without extracting encoding parameters from a stream, a header portion may be kept. With the header portion that has been kept, a black stream can be generated.

In addition, depending on the application, in the direct type according to the first embodiment of the present invention, the black stream generator 550 independently generates a stream containing regions from a sequence layer to a macro block layer with fixed parameters, not parameters of the input stream. The black stream generator 550 adds a sequence end code to the generated stream so as to complete the black stream. In the structure, since it is necessary to store only one set of parameters, the header portion extractor, the parameter memory 552, and the header portion restructuring device 553 can be omitted. In addition, the capacity of the data portion ROM 554 can be minimized. In such a structure, although applicable streams are limited, the structure is effective when an input stream is strictly limited as with a VCR.

Fourth Embodiment

Next, a fourth embodiment of the present invention will be described. The fourth embodiment of the present invention is applied to an MPEG video camera that encodes a photographed picture to an MPEG stream and outputs the encoded MPEG stream. According to the fourth embodiment, based on the indirect type of the third embodiment, a non-signal state is detected and a regular signal is substituted with a base band black signal.

Figure 43:
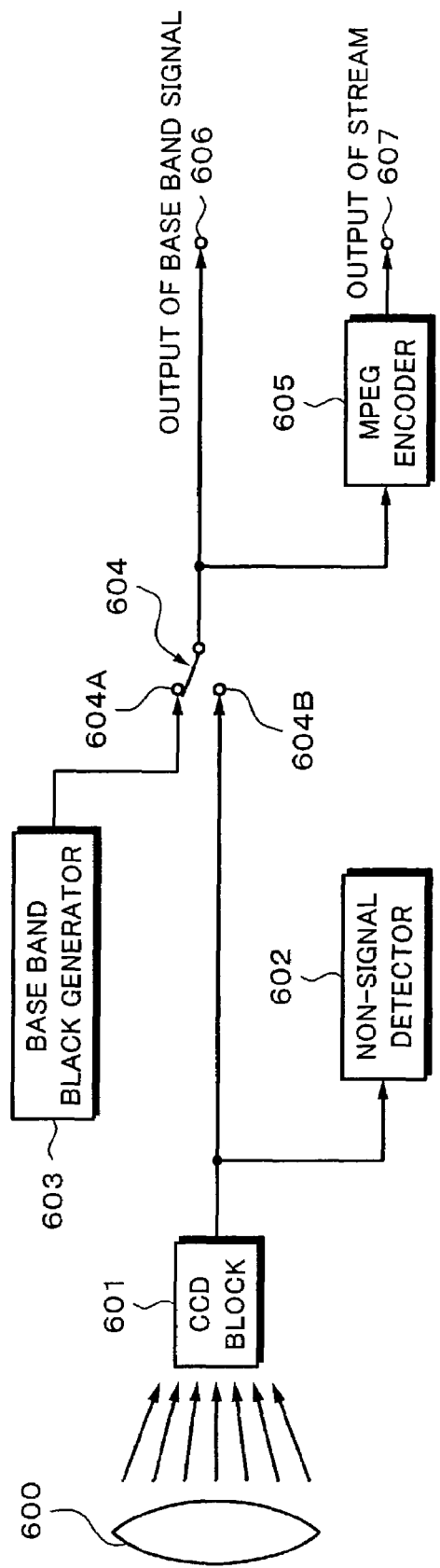
FIG. 43 is a block diagram showing an outlined structure of an example of an MPEG video camera according to a fourth embodiment of the present invention.

FIG. 43 shows an outline of the structure of an example of an MPEG video camera according to the fourth embodiment of the present invention. A photographed picture is collected by a lens system 600. A CCD (Charge Coupled Device) block 601 converts the photographed picture into a picture signal. A predetermined signal process is performed for the picture signal. Thereafter, the processed picture signal is converted into a base band signal. The base band signal is input to a terminal 604B of a switch circuit 604. In addition, the base band signal is supplied to a non-signal detector 602. The non-signal detector 602 detects the non-signal state of the base band signal.

On the other hand, an output signal of a base band black generator 603 that generates a base band black signal is input to a terminal 604A of the switch circuit 604.

The base band signal that is output from the switch circuit 604 is obtained from a terminal 606. In addition, the base band signal is supplied to an MPEG encoder 605. The MPEG encoder 605 encodes the supplied base band signal to an MPEG stream. The MPEG stream is obtained from a terminal 607.

The switch circuit 604 is controlled corresponding to the detected result of the non-signal detector 602. Normally, the terminal 604B is selected. When the non-signal detector 602 has detected a non-signal state of the base band signal that is output from the CCD block 601, the non-signal detector 602 causes the switch circuit 604 to be switched from the terminal 604B to the terminal 604A in the same manner described with reference to FIGS. 39 and 40. The base band signal that is output from the CCD block 601 is substituted with the base band black signal that is output from the base band black generator 603. The base band black signal is output from the switch circuit 604. When the non-signal state of the output signal of the CCD block 601 is restored to the regular stream, in the same manner described with reference to FIGS. 39 and 40, the switch circuit 604 is switched from the terminal 604A to the terminal 604B. As a result, the base band signal that is supplied from the CCD block 601 is output from the switch circuit 604.

The switch circuit 604 may be interpolated with a record button that causes a VCR that is connected to or equipped with the MPEG video camera to be operated in the recording mode. For example, when the record button is not pressed, the terminal 604A is selected. When the record button is pressed, the switch circuit 604 is switched to the terminal 604B.

Fifth Embodiment

Next, a fifth embodiment of the present invention will be described. According to the fifth embodiment, the third embodiment is applied to an MPEG monitor apparatus to which an MPEG stream can be input. According to the fifth embodiment, based on the indirect type of the third embodiment, a non-signal state is detected and a regular signal is substituted with a base band black signal.

FIG. 44 shows an outline of the structure of an example of an MPEG monitor according to the fifth embodiment of the present invention. An MPEG stream is input from a terminal 610. The MPEG stream is supplied to a non-signal state detector 612 that detects a non-signal state of the MPEG stream. In addition, the MPEG stream is supplied to an MPEG decoder 613. The MPEG decoder 613 decodes the supplied MPEG stream and outputs the decoded signal as a base band signal. The base band signal that is output from the MPEG decoder 613 is input to a terminal 615A of a switch circuit 615 that selects an input signal.

On the other hand, a base band signal is input from a terminal 611. The base band signal is input from a terminal 615B of the switch circuit 615.

The base band signal that is input from the terminal 610 of the switch circuit 615 is supplied to a terminal 617B of a switch circuit 617. A base band black signal that is generated by a base band black generator 617 is input to a terminal 617A of the switch circuit 617. An output signal of the switch circuit 617 is supplied to a display device 618 that can display data with the base band signal. The display device 618 is for example a CRT (Cathode Ray Tube) or an LCD (Liquid Crystal Display). The display device 618 includes a driving circuit for the display device.

The switch circuit 617 is controlled corresponding to the detected result of the non-signal detector 612 or the non-signal detector 614 that depends on the selection of the switch circuit 615. Normally, the terminal 618B of the switch circuit 617 is selected.

When the terminal 615A of the switch circuit 615 has been selected, if the non-signal detector 612 detects a non-signal state of the base band signal that is input from the CCD block 601, the non-signal detector 612 causes the switch circuit 617 to be switched from the terminal 617B to the terminal 617A in the manner described with reference to FIGS. 39 and 40. As a result, the base band blank signal that is output from the MPEG decoder 613 is substituted with the base band blank signal that is output from the base band black generator 616. The substituted signal is output from the switch circuit 617 and supplied to the display device 618.

Likewise, when the terminal 615B of the switch circuit 615 has been selected, if the non-signal detector 614 detects a non-signal state of the MPEG stream that is input from the terminal 611, the non-signal detector 614 causes the switch circuit 617 to be switched from the terminal 617B to the terminal 617A in the manner described with reference to FIGS. 39 and 40. The base band signal that is supplied from the terminal 611 is substituted with the base band blank signal that is output from the base band black generator 616. The substituted base band blank signal is output from the switch circuit 617 and supplied to the display device 618.

When the non-signal state is restored to the regular stream, in the manner described with reference to FIGS. 39 and 40, the switch circuit 617 is switched from the terminal 617A to the terminal 617B. The base band signal that is output from the switch circuit 615 is supplied to the display device 618.

According to the fourth embodiment and the fifth embodiment, the black stream interpolation based on the indirect type of the third embodiment was performed. However, it should be noted that the present invention is not limited to such an example. In other words, the direct type of the first embodiment and the indirect type of the second embodiment can be applied to the fourth embodiment and the fifth embodiment.

Moreover, in the forgoing description, the present invention is applied to a VCR, an MPEG video camera, and an MPEG monitor. However, the present invention is not limited to such examples. In other words, the present invention can be applied to a video signal recording and reproducing apparatus, a switcher, an editor, and a repeating apparatus that use a record medium such as a hard disk and a semiconductor memory other than a magnetic tape. In addition, the present invention can be applied to a conventional MPEG decoder and an apparatus to which an encoded stream can be input.

Moreover, in the forgoing description, the compressing and encoding system for a stream is the MPEG2 system. However, the present invention is not limited to such an example. Instead, the present invention can be applied to an apparatus to which a stream that has been encoded corresponding to a compressing and encoding system such as JPEG (Joint Photographic Experts Group) system other than the MPEG2 system.

Moreover, in the forgoing description, a period for a non-signal state is interpolated with a stream that causes a black screen or a gray screen to be displayed. However, the present invention is not limited to such an example. In other words, a period for a non-signal state may be interpolated with a stream that causes for example a blue screen, a green screen, a pink screen, or the like to be displayed. Alternatively, a period for a non-signal state may be interpolated with a stream that causes a particular pattern or a picture to be displayed.

Moreover, in the forgoing description, a stream or a base band signal is directly substituted in a period for a non-signal state under the control of a non-signal detector. However, the present invention is not limited to such an example. Alternatively, the detected result of the non-signal detector may be supplied to a controlling system that controls the entire apparatus. The stream or base band signal may be substituted through the controlling system. When the substitution is controlled through the controlling system, a regular stream can be easily substituted with a black stream or a base band black signal depending on a synchronous state of a signal, presence or absence of a tape cassette, a traveling state of a tape as well as the detected result of the non-signal detector.

Moreover, in the forgoing description, the present invention is applied to a recording and reproducing apparatus that handles a stream of which a video signal has been compressed and encoded. However, the present invention is not limited to such an example. In other words, the present invention can be applied to audio recording apparatuses using audio compressing technologies for example AC-3 (Audio code Number 3), AAC (Advanced Audio Coding), dts (Digital Theater Systems), and ATRAC (Adaptive Transform Acoustic Coding). In this case, a period of a non-signal state is interpolated with a silent (mute) signal.

In addition, when a variable length code is used as with an MPEG stream, if an error takes place in the stream due to an occurrence of a non-signal state, there is a possibility of which a code sequence after the error is fully destroyed. When such a stream is input to the apparatus, noise takes place on the reproduced screen. The system delay of the apparatus may vary. The decoder may malfunction or hang up. The device connected to the apparatus may malfunction or hang up. In other words, such serious problems may take place. Such problems may take place not only when no signal is input, but when a signal input is restarted or a signal reproduction is restarted.

Thus, when a signal input is restarted or a signal reproduction is restarted, by applying an interpolation with a black stream according to the present invention, the syntax of a stream can be kept. As a result, the forgoing apparatus and other device connected thereto can be prevented from malfunctioning and hanging up.

Recent digital video apparatuses are provided with many memories such as a decoder buffer memory, a shuttle reproduction frame memory, a freeze and capture frame memory, a raster scanning frame memory, and so forth. In addition, such apparatuses are provided with many memories as transmission buffers for individual functional blocks.

Now, the case that an input stream stops is considered. In this case, there is a possibility of which data stored in each memory is not pushed, but left. For example, after a tape is removed from a VCR, several frames of video information that have been reproduced are left in a memory. When the next tape is loaded to the VCR and data is reproduced from the tape, the video information that is left in the memory may be pushed and output therefrom. In other words, although one tape is replaced with another tape, the content of the former tape may be displayed.

Applying the present invention, such a problem can be solved. When a region for which a stream is lost is interpolated with a black stream, the content of the memory can be always pushed. As a result, improper data can be prevented from being left in a memory.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A signal processing apparatus, comprising:
   stream generating means for generating a predetermined stream;
   determining means for determining whether an input stream is in an insignificant state; and
   stream substituting means for substituting the input stream determined as being in the insignificant state with the predetermined stream generated by the stream generating means according to the result of the determining means;
   a memory for storing the predetermined stream in accordance with the insignificant state;

an output means for outputting the result of the determining means as a control signal of a switch circuit, wherein, when a pre-input stream, which is independent from the input stream and sequentially precedes the substitution of the input stream with the predetermined stream, is completed with a sequence end code, contents of a sequence header and a sequence extension of a header portion of the predetermined stream are independent of the parameters extracted from the pre-input stream, and wherein, when the pre-input stream is not completed with a sequence end code, contents of a sequence header and a sequence extension of a header portion of the predetermined stream are the same as the parameters extracted from the pre-input stream.

2. The signal processing apparatus as set forth in claim 1, wherein the determining means determines a non-signal state of the input stream as the insignificant state.

3. The signal processing apparatus as set forth in claim 1, wherein the stream generating means directly generates the predetermined stream.

4. The signal processing apparatus as set forth in claim 1, wherein the stream generating means encodes a base band signal corresponding to the predetermined stream so as to generate the encoded stream.

5. The signal processing apparatus as set forth in claim 1, wherein the predetermined stream is a stream that causes a black screen to be displayed.

6. The signal processing apparatus as set forth in claim 1, wherein the predetermined stream is a stream that causes a gray screen to be displayed.

7. The signal processing apparatus as set forth in claim 1, wherein the output means outputs both the predetermined stream substituted by the stream substituting means and a base band signal corresponding to the predetermined stream.

8. The signal processing apparatus as set forth in claim 1, further comprising:
recording means for recording the stream output from the stream substituting means to a record medium.

9. The signal processing apparatus as set forth in claim 8, wherein the stream generating means encodes a base band signal corresponding to the predetermined stream so as to generate the encoded stream.

10. The signal processing apparatus as set forth in claim 1, further comprising:
reproducing means for reproducing a stream recorded on a record medium and outputting the stream as the input stream.

11. A signal processing method, comprising the steps of:
generating a predetermined stream;
determining whether an input stream is in an insignificant state;
substituting the input stream determined as the insignificant state with the predetermined stream generated at the stream generating step according to the determined result at the determining step;
pre-storing the predetermined stream in accordance with the insignificant state pre-stored in a memory portion;
outputting the determined result of the determining means as a control signal of a switch circuit; and
designing freely, when a pre-input stream, which is independent from the input stream and sequentially precedes the substitution of the input stream with the predetermined stream is completed with a sequence end code, contents of a sequence header and a sequence extension of a header portion of the predetermined stream, the contents being independent of the parameters extracted from the input stream, wherein, when the pre-input stream is not completed with a sequence end code, contents of a sequence header and a sequence extension of a header portion of the predetermined stream are the same as the parameters extracted from the input stream.

12. A recording and reproducing apparatus, comprising:
stream generating means for generating a predetermined stream;
first determining means for determining whether an input stream is in an insignificant state;
first stream substituting means for substituting the input stream determined as the insignificant state with the predetermined stream generated by the stream generating means according to the determined result of the first determining means;
a memory for storing the predetermined stream in accordance with the insignificant state;
an output means for outputting the result of the determining means as a control signal of a switch circuit;
recording means for recording the stream output from the stream substituting means to a record medium;
reproducing means for reproducing a stream recorded on the record medium;
second determining means for determining whether or not the reproduced stream reproduced by the reproducing means is in an insignificant state; and
second stream substituting means for substituting the reproduced stream determined as the insignificant state with the predetermined stream generated by the stream generating means according to the determined result of the second determining means, wherein, when a pre-input stream, which is independent from the input stream and sequentially precedes the substitution of the input stream with the predetermined stream, is completed with a sequence end code, contents of a sequence header and a sequence extension of a header portion of the predetermined stream are independent of the parameters extracted from the input stream, and wherein, when the pre-input stream is not completed with a sequence end code, contents of a sequence header and a sequence extension of a header portion of the predetermined stream are the same as the parameters extracted from the input stream.

13. The recording and reproducing apparatus as set forth in claim 12,
wherein the first determining means determines a non-signal state of the input stream as the insignificant state, and
wherein the second determining means determines a non-signal state of the reproduced stream as the insignificant state.

14. The recording and reproducing apparatus as set forth in claim 12,
wherein the stream generating means directly generates the predetermined stream.

15. The recording and reproducing apparatus as set forth in claim 12,
wherein the stream generating means encodes a base band signal corresponding to the predetermined stream so as to generate the encoded stream.

16. The recording and reproducing apparatus as set forth in claim 12,
  wherein the predetermined stream is a stream that causes a black screen to be displayed.

17. The recording and reproducing apparatus as set forth in claim 12,
  wherein the predetermined stream is a stream that causes a gray screen to be displayed.

18. The recording and reproducing apparatus as set forth in claim 12,
  wherein the stream generating means is disposed only on the reproducing side, and
  wherein the second stream substituting means directly supplies the predetermined stream output from the stream generating means disposed on the reproducing side to a downstream side of the second determining means disposed on the recording side.

19. The recording and reproducing apparatus as set forth in claim 12, wherein the output means outputs both the predetermined stream substituted by the second stream substituting means and a base band signal corresponding to the predetermined stream.

20. A recording and reproducing method, comprising the steps of:
  generating a predetermined stream;
  determining whether an input stream is in an insignificant state;
  substituting the input stream determined as the insignificant state with the predetermined stream generated at the stream generating step according to the determined result for the input stream;
  pre-storing the predetermined stream in accordance with the insignificant state pre-stored in a memory portion;
  recording the stream output at the stream substituting step to a record medium;
  reproducing a stream recorded on the record medium;
  determining whether or not the reproduced stream reproduced at the reproducing step is in an insignificant state;
  outputting the determined result of the determining means as a control signal of a switch circuit;
  substituting the reproduced stream determined as the insignificant state with the predetermined stream generated at the stream generating step according to the determined result for the reproduced stream; and
  designing freely, when a pre-input stream, which is independent from the input stream and sequentially precedes the substitution of the input stream with the predetermined stream, is completed with a sequence end code, contents of a sequence header and a sequence extension of a header portion of the predetermined stream, the contents being independent of the parameters extracted from the input stream,
  wherein, when the pre-input stream is not completed with a sequence end code, contents of a sequence header and a sequence extension of a header portion of the predetermined stream are the same as the parameters extracted from the input stream.

\* \* \* \* \*